(12) United States Patent
Akamine et al.

(10) Patent No.: US 11,841,454 B2
(45) Date of Patent: Dec. 12, 2023

(54) RADAR SYSTEM SUPPRESSING INTERFERENCE BETWEEN A PLURALITY OF RADAR UNITS

(71) Applicants: SOKEN, INC., Nisshin (JP); DENSO CORPORATION, Kariya (JP)

(72) Inventors: Yusuke Akamine, Nisshin (JP);
Takayuki Kitamura, Kariya (JP);
Yasuyuki Miyake, Kariya (JP)

(73) Assignees: SOKEN, INC., Nisshin (JP); DENSO CORPORATION, Kariya (JP)

( * ) Notice: Subject to any disclaimer, the term of this patent is extended or adjusted under 35 U.S.C. 154(b) by 681 days.

(21) Appl. No.: 17/062,165

(22) Filed: Oct. 2, 2020

(65) Prior Publication Data
US 2021/0018588 A1 Jan. 21, 2021

Related U.S. Application Data

(63) Continuation of application No. PCT/JP2019/013697, filed on Mar. 28, 2019.

(30) Foreign Application Priority Data

Apr. 6, 2018 (JP) .................................. 2018-074130

(51) Int. Cl.
*G01S 7/02* (2006.01)
*G01S 7/41* (2006.01)
*G01S 13/58* (2006.01)

(52) U.S. Cl.
CPC ............ *G01S 7/023* (2013.01); *G01S 7/0232* (2021.05); *G01S 7/0235* (2021.05); *G01S 7/411* (2013.01); *G01S 7/415* (2013.01); *G01S 13/584* (2013.01)

(58) Field of Classification Search
CPC ...... G01S 7/023; G01S 7/0235; G01S 7/0232; G01S 7/411; G01S 7/415; G01S 13/584
See application file for complete search history.

(56) References Cited

U.S. PATENT DOCUMENTS

2010/0103023 A1* 4/2010 Ogawa .................. G01S 13/931
342/70
2019/0351906 A1* 11/2019 Oh ....................... B60W 30/095

FOREIGN PATENT DOCUMENTS

| JP | 2008-292264 A | 12/2006 |
|----|---------------|---------|
| JP | 2017-203735 A | 11/2017 |
| JP | 2018-004602 A | 1/2018  |

* cited by examiner

*Primary Examiner* — Marc Anthony Armand
(74) *Attorney, Agent, or Firm* — MASCHOFF BRENNAN

(57) ABSTRACT

A radar system is provided with a plurality of radar units. Each radar unit includes a first processing unit for calculating a distance and a relative speed to an object in the vicinity of each radar unit in accordance with a beat signal, a frequency band of the first modulated waves being a first frequency band, and a modulation period of the first modulated waves being a first modulation period; a second processing unit for calculating a distance to the object in accordance with a beat signal, a frequency band of the second modulated waves being a second frequency band, and a modulation period of the second modulated waves being a second modulation period; and a calculation result determination unit for determining the distance and the relative speed to the object in accordance with calculation results of the first and second processing units.

11 Claims, 22 Drawing Sheets

FIG.10
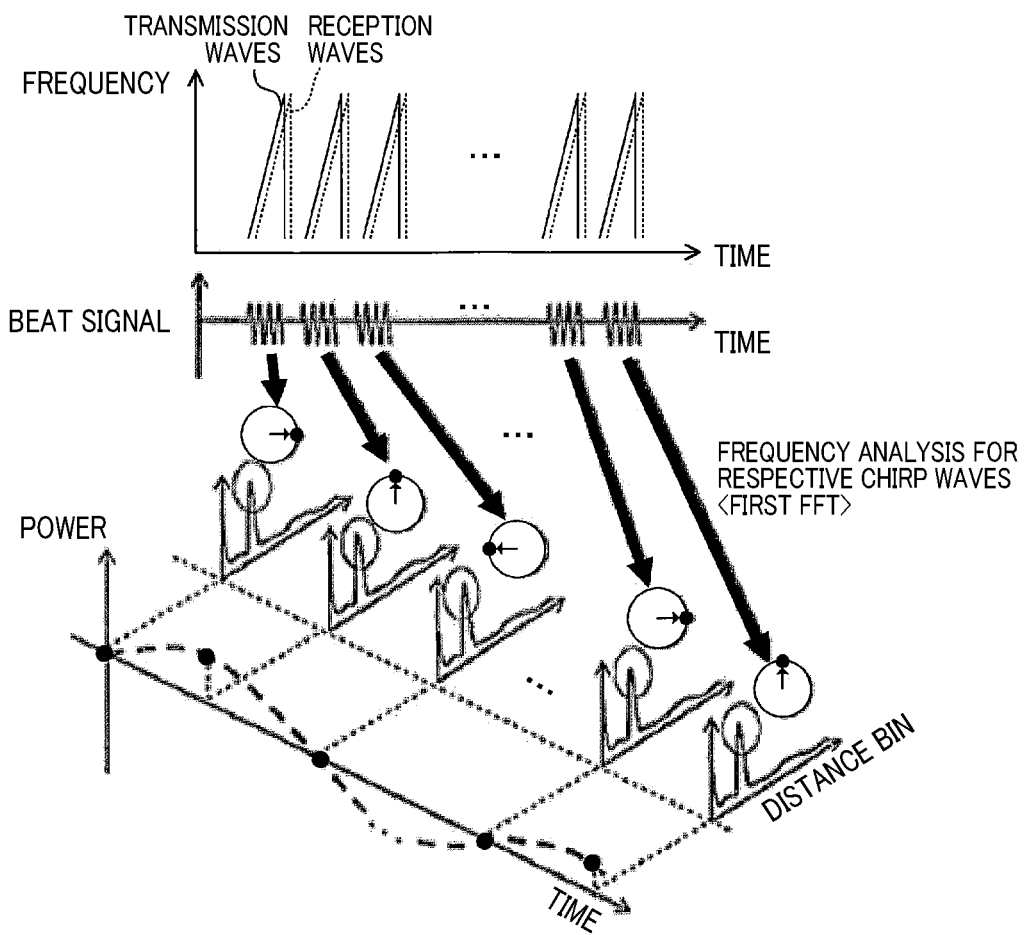
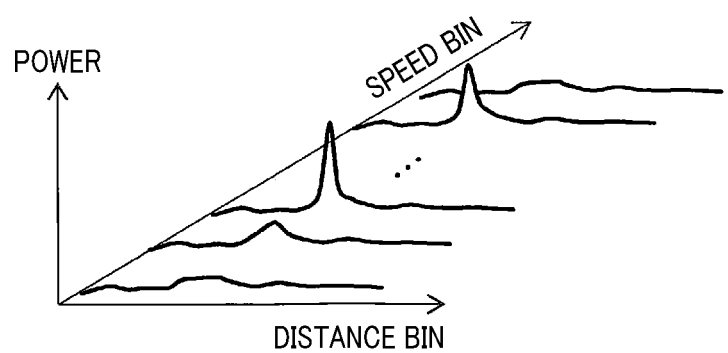

RADAR SYSTEM SUPPRESSING INTERFERENCE BETWEEN A PLURALITY OF RADAR UNITS

This application is the U.S. bypass application of International Application No. PCT/JP2019/013697 filed Mar. 28, 2019 which designated the U.S. and claims priority to Japanese Patent Application No. 2018-074130, filed Apr. 6, 2018, the contents of which are incorporated herein by reference.

BACKGROUND

Technical Field

The present disclosure relates to a technique for suppressing interference between a plurality of radar units.

Description of the Related Art

Interference between radar units that decreases accuracy for detecting distance and direction of an object needs to be suppressed. In this respect, as a method of suppressing the interference between radar units, frequency bands of modulated waves simultaneously transmitted from a plurality of radar units are prevented from being overlapped.

SUMMARY

The present disclosure provides a radar system capable of achieving high speed resolution and high distance resolution while suppressing interference between a plurality of radar units.

As one aspect of the present disclosure, a radar system is provided with a plurality of radar units. Each of the plurality of radar units includes: a first processing unit, a second processing unit, and a calculation result determination unit. The first processing unit is configured to calculate a distance and a relative speed to an object in the vicinity of each radar unit in accordance with a beat signal acquired by transmitting and receiving first modulated waves, a frequency band of the first modulated waves being a first frequency band, and a modulation period of the first modulated waves being a first modulation period. The second processing unit is configured to calculate a distance to the object in accordance with a beat signal acquired by transmitting and receiving second modulated waves, a frequency band of the second modulated waves being a second frequency band, and a modulation period of the second modulated waves being a second modulation period. The calculation result determination unit is configured to determine the distance and the relative speed to the object in accordance with a calculation result of the first processing unit and a calculation result of the second calculation result.

BRIEF DESCRIPTION OF THE DRAWINGS

In the accompanying drawings:

FIG. 10 is an explanatory diagram showing a theory of two-dimensional Fast Fourier Transformation (FFT);

DETAILED DESCRIPTION OF THE PREFERRED EMBODIMENTS

As an example of above-mentioned conventional technique for suppressing interference between radar units, Japanese Patent No. 4766404 discloses a radar apparatus provided with at least two radar units in which frequencies of modulated waves simultaneously transmitted from at least two radar units are controlled to avoid continuation of a period where mutually the same frequency of the modulated waves occur. As a result, interference between the radar units is suppressed. Thus, as a method of suppressing interference between radar units, frequency bands of modulated waves simultaneously transmitted from a plurality of radar units are prevented from being overlapped. Moreover, as another example for suppressing interference, there is a technique in which modulated waves are not transmitted simultaneously from a plurality of radar units, that is, the modulation periods are not overlapped. Note that the modulation periods refer to periods in which modulated waves are outputted from the respective radar units.

As a method of radar modulation, Fast Chip Modulation (i.e. FCM) is known. According to the FCM method, the wider the frequency band of the modulated waves, the more improved the resolution of the distance, and the longer the modulation periods of the modulated waves, the more improved the resolution of the speed. As a result of keen research by the inventors, the inventors discovered the following problems in the case where the above-described method is embodied in order to suppress the interference between a plurality of radar units. In the case where overlapping of the frequency bands of the modulated waves is avoided, the frequency bands of respective modulated waves become narrower, thus degrading the resolution of detected distance. On the other hand, when controlling the modulation periods not to be overlapped during an operation period of the system, each modulation period becomes shorter, thereby lowering the resolution of the speed.

Hereinafter, with reference to the drawings, embodiments of the present disclosure will be described.

First Embodiment

1. Configuration

Figure 1:
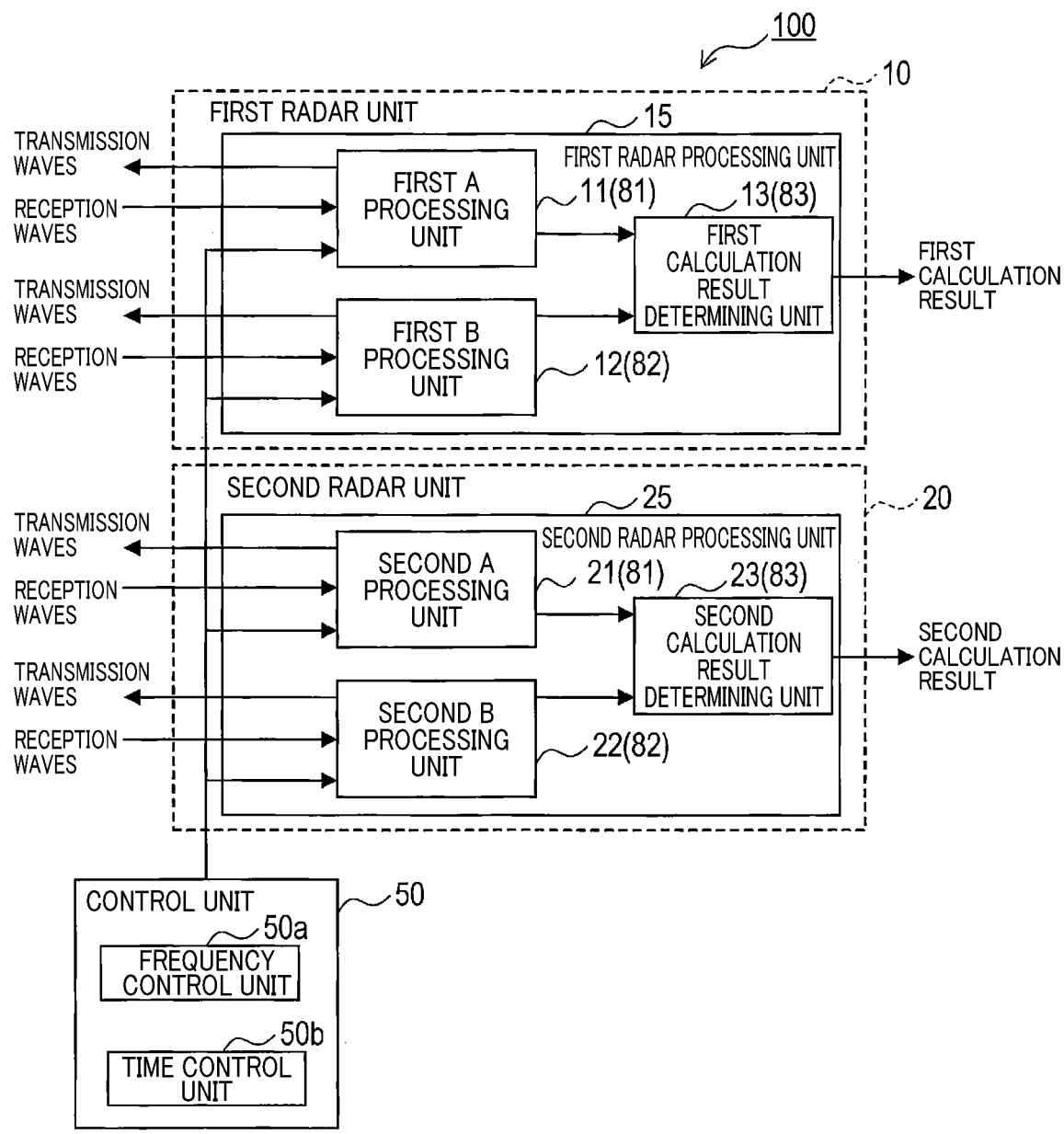
FIG. 1 is a block diagram showing a configuration of a radar system according to a first embodiment of the present disclosure.

Firstly, with reference to FIG. 1, a radar system 100 according to the first embodiment is described. The radar system 100 is provided with two radar units which are mounted on a vehicle.

Figure 2:
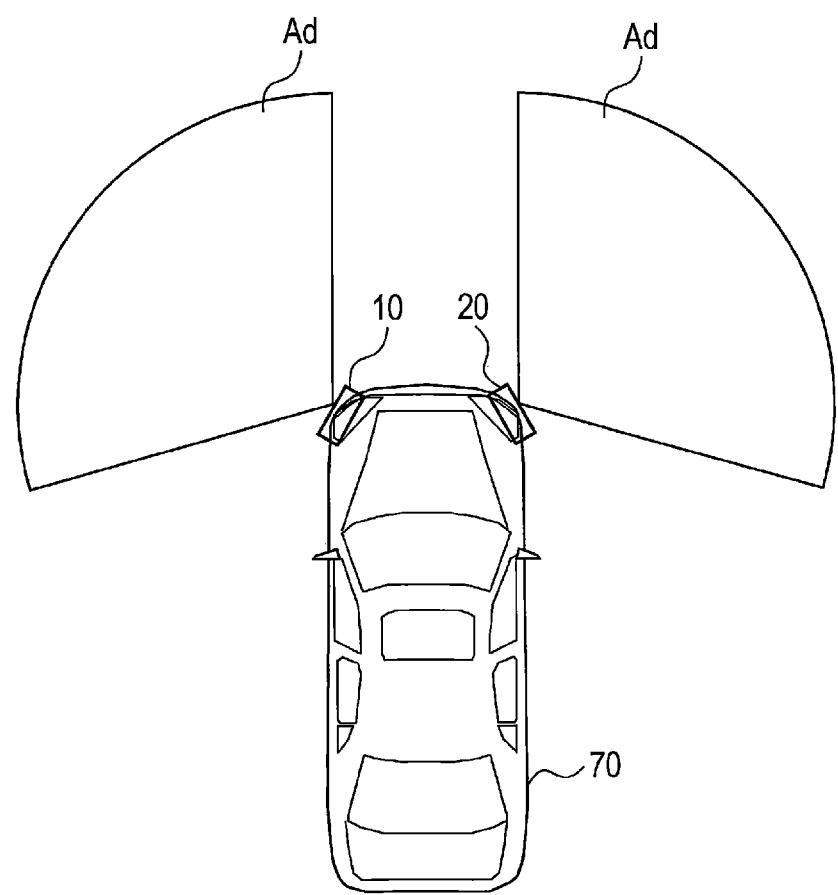
FIG. 2 is a diagram showing an example of mounting positions of radar units and a detection range according to the first embodiment.
Figure 3:
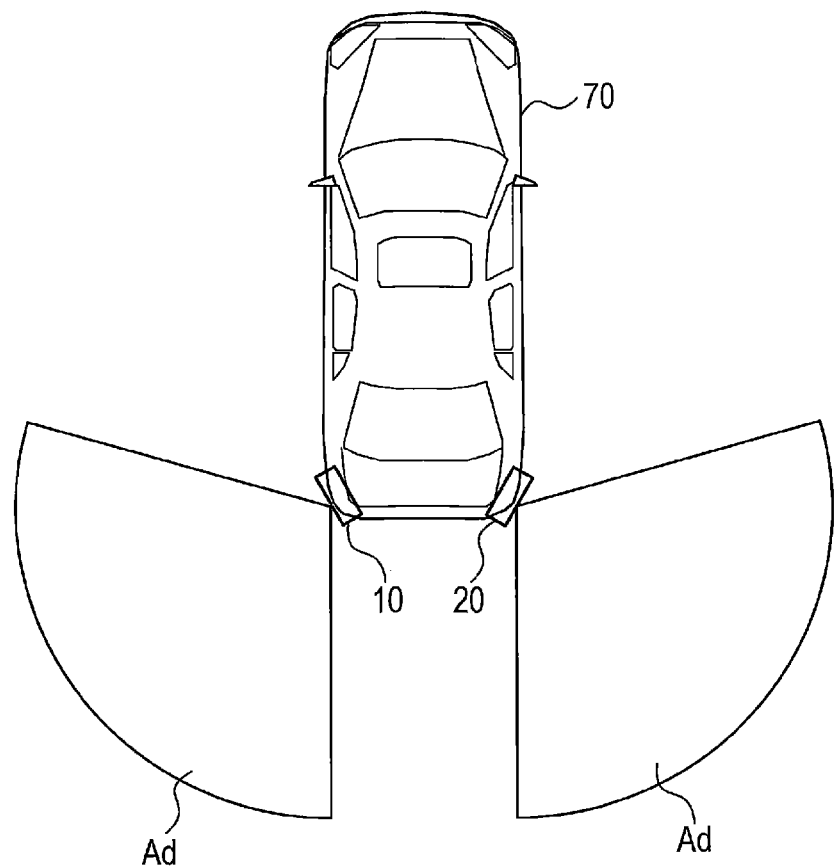
FIG. 3 is a diagram showing another example of mounting positions of radar units and a detection range according to the first embodiment.

The radar system 100 is provided with a first radar unit 10, a second radar unit 20 and a control unit 50. The first radar unit 10 and the second radar unit 20 are mounted at different positions in the vehicle so as to cover mutually different area in the vicinity of a vehicle 70. For example, as shown in FIG. 2, the first radar unit 10 and the second radar unit 20 may be mounted at both ends of a front bumper of the vehicle 70 in a left-right direction of the front bumper (i.e. vehicle width direction), and have detection ranges Ad to be a front left area and a front right area of the vehicle 70. Also, as shown in FIG. 3, the first radar 10 and the second radar 20 may be mounted at both ends of a rear bumper of the vehicle 70 in a left-right direction (i.e. vehicle width direction), and have detection ranges Ad to be a rear left area and a rear right area of the vehicle 70.

The first radar unit 10 and the second radar unit 20 transmits/receives modulated waves (i.e. radar waves) to acquire beat signals, and apply a frequency-analysis to the acquired beat signals, thereby calculating the speed V and a distance R of an object which reflected the modulated waves. Here, a relative speed of the object relative to the vehicle 70 refers to the speed V of the object and a distance from the vehicle 70 to the object refers to the distance R. The first radar unit 10 and the second radar 20 are each configured as a FCM (fast chirp modulation) millimeter wave radar in which predetermined number of chirp waves are transmitted/received as modulated waves.

Figure 4:
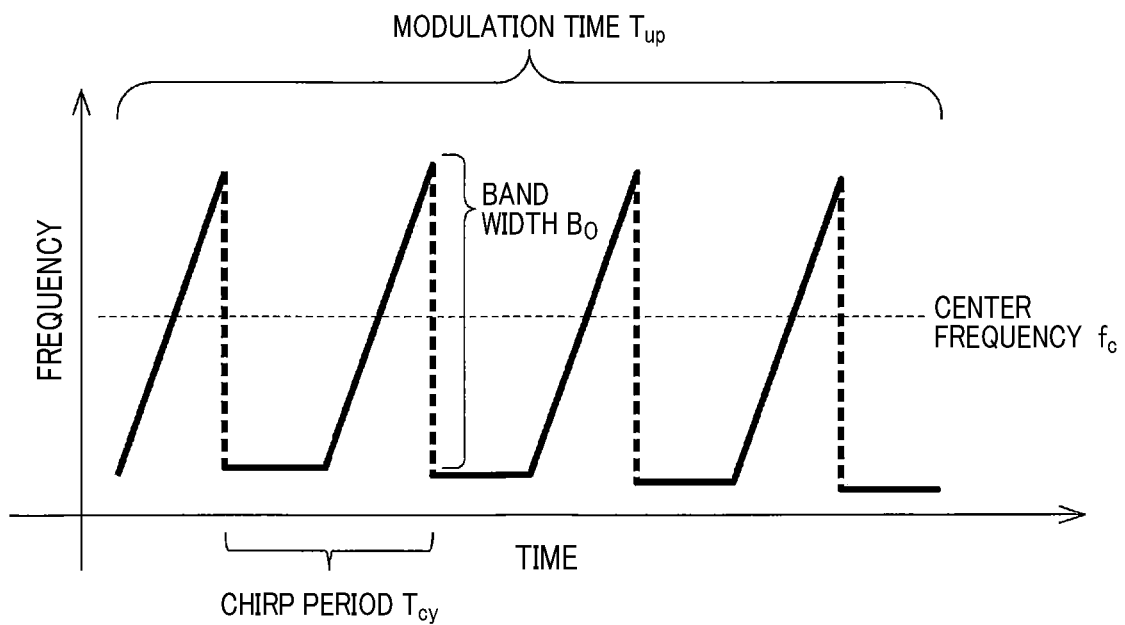
FIG. 4 is a diagram showing an example of modulation method of modulated waves.

FIG. 4 shows chirp waves of which the center frequency is fc. The chirp waves are radar waves of which the frequency continuously increases or decreases with time. In other words, the chirp waves refer to frequency-modulated radar waves in which the frequency changes in a saw-tooth wave. As shown in FIG. 4, the chirp period Tcy is defined as a period where the frequency changes from the minimum to the maximum. The frequency band Bo of the chirp waves is defined as a frequency band from the minimum frequency to the maximum frequency of the chirp waves. The modulation period Tup of the modulated waves is an output period of the modulated waves including predetermined number of chirp waves. In the case where the modulated waves include N number of chirp waves, the modulation period Tup is N×Tcy, where N is natural number.

In this case, the speed resolution $\Delta V$ of chirp waves is expressed by an equation (1). It should be noted that c refers to the speed of light. The distance resolution $\Delta R$ of the chirp waves is expressed by an equation (2). Further, the maximum detection speed Vmax of the chirp waves is expressed by an equation (3). The maximum detection speed Vmax is a maximum speed V capable of being detected without folding. In the case where the speed V is in a range of $-V\text{max}<V<V\text{max}$, the speed V can be detected from the beat signals acquired by transmitting and receiving chirp waves without folding.

$$\Delta V = \frac{c}{2 f_c \cdot T_{up}} \qquad (1)$$

$$\Delta R = \frac{c}{2 B_0} \qquad (2)$$

$$V_{max} = \frac{c}{4 f_c \cdot T_{cy}} \qquad (3)$$

The first radar unit 10 includes a first radar processing unit 15 and the second radar unit 20 includes a second radar processing unit 25. The first radar processing unit 15 includes CPU, ROM and RAM, and accomplishes functions of a first A processing unit 11, a first B processing unit 12 and a first calculation result determination unit 13 by executing programs stored in the ROM or the like with the CPU. Similarly, the second radar processing unit 25 includes CPU, ROM and RAM, and accomplishes functions of a second A processing unit 21, a second B processing unit 22 and a second calculation result determination unit 23 by executing programs stored in the ROM or the like with the CPU. The programs are executed, whereby methods corresponding to the programs are executed. Moreover, a part of or all of functions may be accomplished by hardware circuits in which logic circuits and analog circuits or the like are combined.

The first A processing unit 11 calculates the speed Va of the object and the distance Ra to the object, based on the beat signals acquired by transmitting and receiving the modulated waves S1A. The first B processing unit 12 calculates the speed Vb of the object and the distance Rb to the object, based on the beat signals acquired by transmitting and receiving the modulated waves S1B. The first calculation result determination unit 13 determines the speed V and distance R of the object based on the calculation result of the first A processing unit 11 and the calculation result of the first B processing unit 12. Similarly, the second A processing unit 21 calculates the speed Va and the distance Ra of the object based on the beat signals acquired by transmitting and receiving the modulated waves S2A. The second B processing unit 22 calculates the speed Vb and the distance Rb of the object based on the beat signals acquired by transmitting and receiving the modulated waves S2B. The second calculation result determination unit 23 determines the speed V and distance R of the object based on the calculation result of the second A processing unit 21 and the calculation result of the second B processing unit 22. Note that the modulated waves S1A, S2A, S1B and S2B will be detailed later.

According to the present embodiment, the first A processing unit 11 and the second A processing unit 21 correspond to the first processing unit and the first B processing unit 12 and the second B processing unit 22 correspond to the second processing unit. Further, the first calculation result determination unit 13 and the second calculation result determination unit 23 correspond to the calculation result determination unit. The control unit 50 includes CPU, ROM and RAM and the CPU and accomplishes functions of a frequency control unit 50a and the time control unit 50b by executing programs stored in the ROM or the like with the CPU. The programs are executed, whereby methods corresponding to the programs are executed. Moreover, a part of or all of functions may be accomplished by hardware circuits in which logic circuits and analog circuits or the like are combined.

Figure 5:
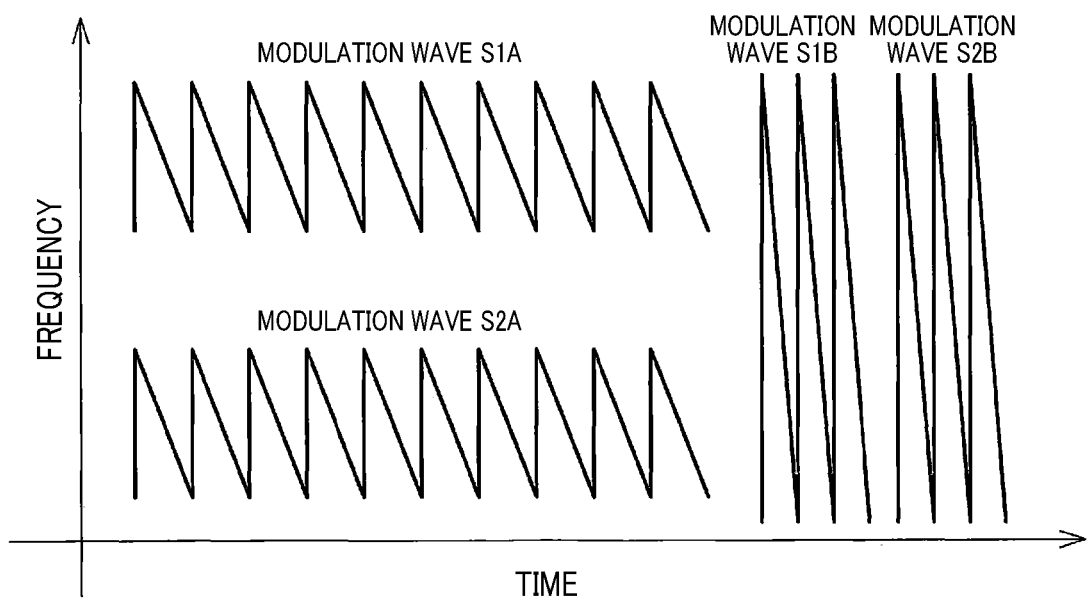
FIG. 5 is an example of modulated waves transmitted from a first and second radar units and received by the first and second radar units according to the first embodiment.
Figure 6:
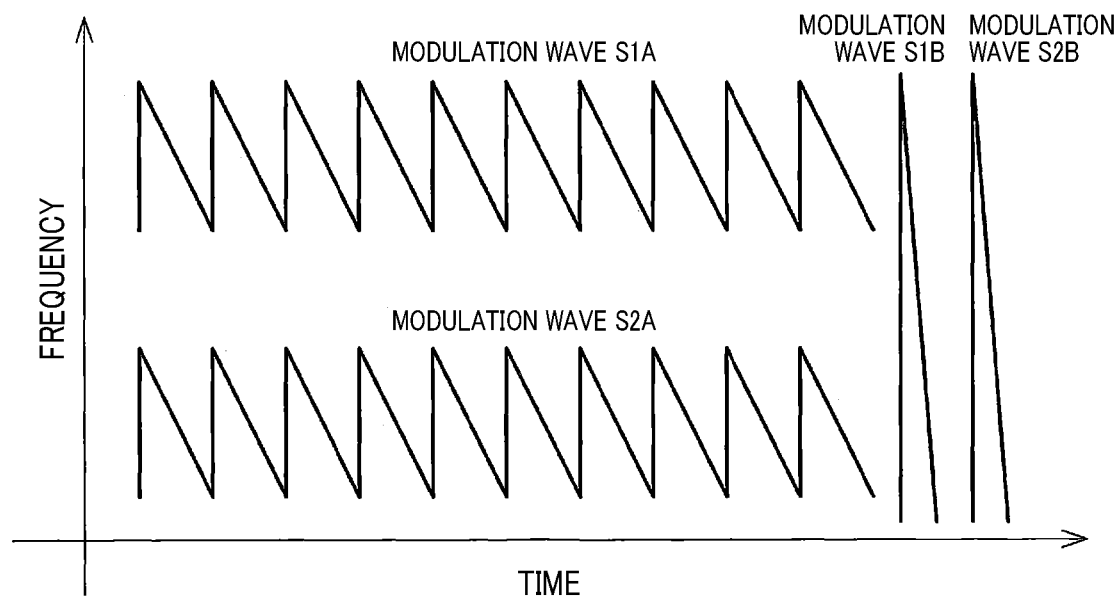
FIG. 6 is another example of modulation waves transmitted from a first and second radar units and received by the first and second radar units according to the first embodiment.
Figure 7:
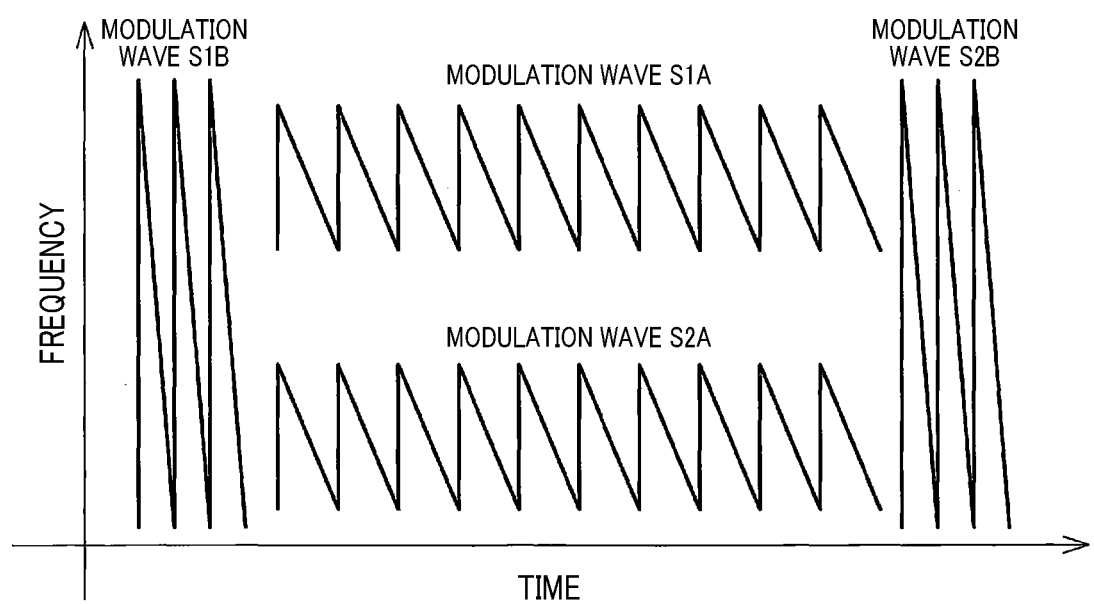
FIG. 7 is another example of modulated waves transmitted from a first and second radar units and received by the first and second radar units according to the first embodiment.

The frequency control unit 50a controls the frequency bands B1A, B2A, B1B, B2B of the modulated waves S1A, S2A, S1B and S2B. As shown in FIGS. 5 to 7, the modulated waves S1A, S2A, S1B and S2B include a predetermined number of chirp waves, and these four types of modulated waves are repeatedly transmitted and received.

Specifically, the frequency control unit 50a controls the frequency bands B1A, B2A, B1B, B2B to satisfy the following conditions (A) to (C). As shown in FIGS. 5 to 7, the frequency control unit 50a controls the frequency bands B1A, B2A, B1B, B2B to satisfy the condition (A) such that the frequency bands B1B and B2B of the modulated waves S1B and S2B are wider than the frequency bands B1A, B2A of the modulated waves S1A, S2A. Further, as shown FIGS. 5 to 7, the frequency control unit 50a controls the frequency bands B1A and B2A to satisfy the condition (B) such that the frequency bands B1A and B2A are different not to overlap with each other. Moreover, as shown in FIGS. 5 to 7, the frequency control unit 50a controls the frequency bands B1B, B2B to satisfy the condition (C) such that the frequency bands B1B and B2B are overlapped with each other. Note that "not overlapped with each other" refers to a region in which frequency regions are overlapped with each other is not present, and "overlapped with each other" refers to that at least a part of frequency regions are overlapped with each other.

As represented by the equation (2), according to the FCM method, the distance resolution ΔR changes such that the wider the frequency band Bo of the modulated waves, the higher the distance resolution ΔR is. Hence, the distance resolution ΔR of the distance Rb calculated based on the modulated waves S1B and S2B is higher than that of of the distance Ra calculated based on the modulated waves S1A and S2A.

The time control unit 50b controls the modulation periods T1A, T2A, T1B and T2B of the modulated waves S1A, S2A, S1B and S2B. Specifically, the time control unit 50b controls the modulation periods T1A, T2A, T1B, and T2B to satisfy the following conditions (D) to (F). As shown in FIGS. 5 to 7, the time control unit 50b controls the modulation periods T1A, T2A, T1B, T2B to satisfy the condition (D) such that the modulation periods T1A and T2A of the modulated waves S1A and S2A are longer than the modulation periods T1B and T2B of the modulated waves S1B and S2B. As shown in FIGS. 5 to 7, the time control unit 50b controls the modulation periods T1A, T2A, T1B and T2B to satisfy the condition (E) such that the modulation periods T1B and T2B are different from each other and are not overlapped with each other, and the respective modulation periods T1B and T2B are different from the modulation period T1A and T2A and are not overlapped with each other. Further, as shown in FIGS. 5 to 7, the time control unit 50b controls the modulation period T1A and T2A to satisfy the condition (F) such that the modulation periods T1A and T2A are overlapped with each other. Note that "not overlapped" refers to that no time period of the modulation periods which are overlapped with each other is present, and "overlapped" refers to that at least a part of time period of modulation periods are overlapped with each other.

According to the present embodiment, the modulated waves S1A and S2A correspond to first modulated waves, and the modulated waves S1B and S2B correspond to second modulated waves. Further, the modulation period T1A and T2A correspond to first modulation period and the modulation period T1B and T2B correspond to second modulation period. Also, the frequency bands B1A and B2A correspond to first frequency band and the frequency bands B1B and B2B correspond to second frequency band.

As shown in equation (1), according to the FCM method, the speed resolution ΔV is defined such that the longer the modulation period Tup, the speed resolution ΔV is. Accordingly, the speed resolution ΔV of the speed Va calculated based on the modulated waves S1A and S2A is larger than that of the speed Vb calculated based on the modulated waves S1B and S2B.

Further, each of the modulated waves S1B and S2B does not overlap with modulation period of the other modulated waves and the frequency bands of the modulated waves S1A and S2A are different from each other. Hence, the modulated waves S1A, S2A, S1B and S2b are not interfered with each other.

According to the present embodiment, the modulated waves S1A and S2A, and the modulated waves S1B and S2B, may have different chirp period Tcy. In this case, as shown in equation (3), the maximum detection speed of the speed Va calculated based on the modulated waves S1A and S2A, and the maximum detection speed of the speed Vb calculated based on the modulated waves S1B and S2B are different from each other.

Modulation Control Process

Figure 8:
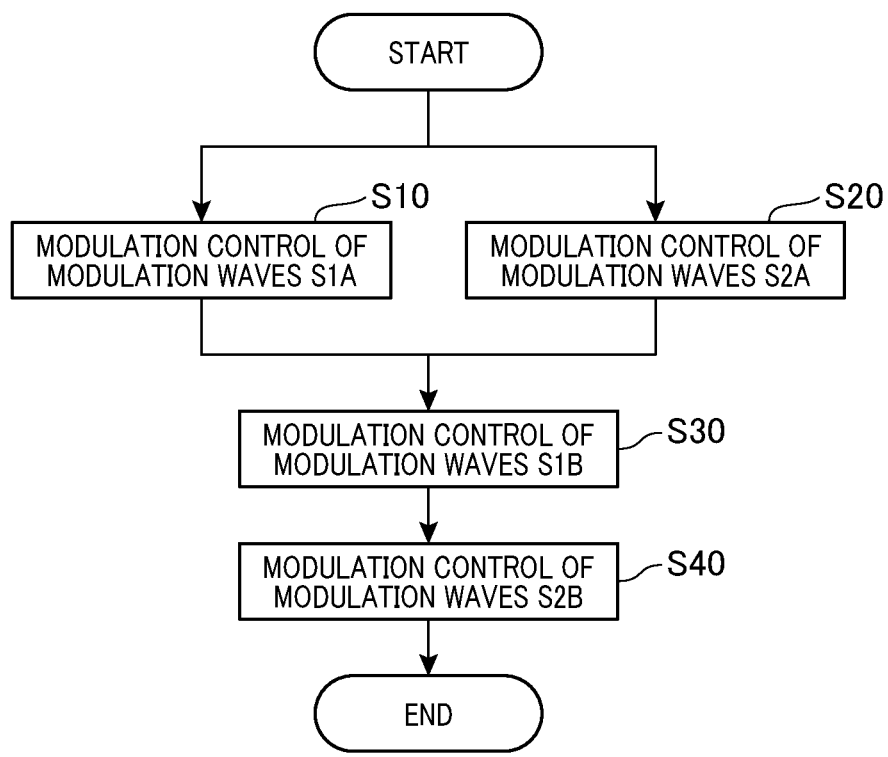
FIG. 8 is a flowchart showing processes of a modulation control according to the first embodiment.

Next, a modulation control process executed by the control unit 50 will be described with reference to a flowchart show in FIG. 8. The control unit 50 repeatedly execute the modulation control process at predetermined intervals. In the flowchart shown in FIG. 8, the radar system 100 is configured to transmit the modulated waves S1A, S2A, S1B and S2B of modulation patterns shown in FIG. 5.

Firstly, at step S10 and step S20, the control unit 50 controls a modulation of the modulated waves S1A and controls a modulation of the modulated waves S2A. The control unit 50 sets the frequency band B1A and modulation period T1A of the modulated waves S1A and sets the frequency band B2A and the modulation period T2A of the modulated waves S2A. Then, the control unit 50 transmits the frequency band B1A and the modulation period T1A which have been set, to the first A processing unit 11 of the first radar unit 10, and the control unit 50 transmits the frequency band B2A and the modulation period T2A which have been set, to the second A processing unit 21 of the second radar unit 20.

In this case, the modulation period T1A and the modulation period T2A are the same. Each of the band widths of the frequency band B1A and the frequency band B2A is approximately half of a band width of a frequency band capable of being used for transmission and reception of the radar system 100, and the band widths are not overlapped with each other. Here, performance of the distance resolution and the speed resolution, which is required by an application using the detection result of the object, is changed depending on the travelling speed of the vehicle 70. Hence, the control unit 50 may change, depending on the travelling speed of the vehicle, the frequency bands B1A and B2A and the modulation periods T1A and T2A within a range which satisfies the above-described conditions (A) to (F). By executing the processes at step S10 and step S20, the first radar unit 10 and the second radar unit 20 simultaneously transmits the modulated waves S1A and the S2A without interfering with each other.

Subsequently, at step S30, the control unit 50 controls the modulation of the modulated waves S1B. Specifically, the control unit 50 sets the frequency band B1B and the modulation period T1B of the modulated waves S1B. Then, the control unit 50 transmits the frequency band B1B and the modulation period T1B which have been set, to the first B processing unit 12 of the first radar 10. In this case, the band width of the frequency band B1B is approximately twice as much as the band width of each of the frequency bands B1A and B2A. Also, in this case, the control unit 50 may change, depending on the travelling speed of the vehicle, the frequency band B1B and the modulation period T1B within a range which satisfies the above-described conditions (A) to (F). By executing the process at step S30, the first radar unit 10 transmits the modulated waves S1B after completing the transmission of the modulated waves S1A and the modulated waves S2A.

Subsequently, at step S40, the control unit 50 controls the modulation of the modulated waves s2B. Specifically, the control unit 50 sets the frequency band B2B of the modulated waves S2B and the modulation period T2B. Then, the control unit 50 transmits the frequency band B2B and the modulation period T2B which have been set, to the second B processing unit 22 of the second radar 20. In this case, the frequency band B2B is the same as that of the frequency band B1B. Also, in this case, the control unit 50 may change, depending on the travelling speed of the vehicle, the frequency band B2B and the modulation period T2B within a range which satisfies the above-described conditions (A) to (F). By executing the process at step S40, the second radar unit 20 transmits the modulated waves S2B after completing the transmission of the modulated waves S1B. With the above-described steps, one transmission cycle is completed.

3. Process for Determining Speed and Distance

Figure 9:
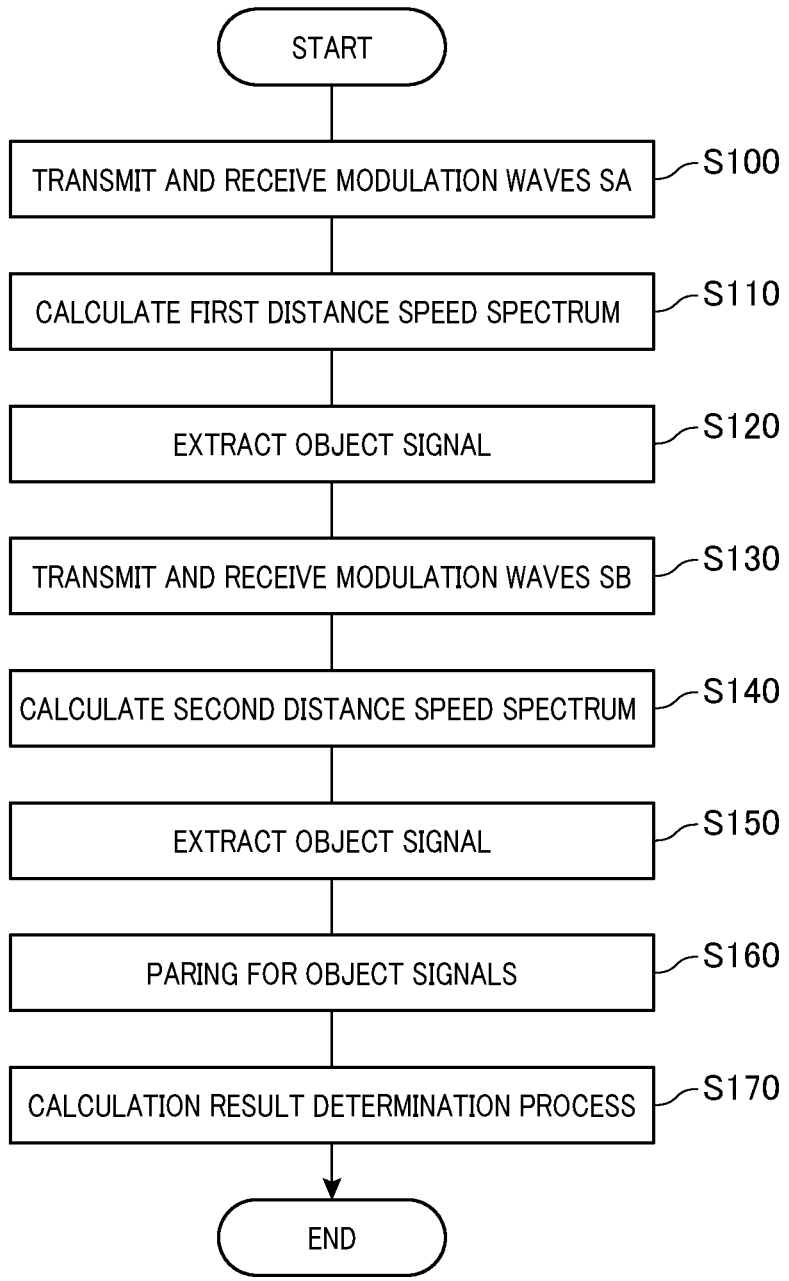
FIG. 9 is a flowchart showing processes for determining a speed of an object and a distance to the object according to the first embodiment.

Next, a process for determining the speed V and the distance R executed by the first radar processing unit 15 and the second radar processing unit 25 will be described with reference to FIG. 9. The first radar processing unit 15 and the second radar processing unit 25 repeatedly executes the determining process at predetermined intervals.

Hereafter, the first A processing unit 11 and the second A processing unit 21 are collectively referred to as a A processing unit 81, and the first B processing unit 12 and the second B processing unit 22 are collectively referred to as a B processing unit 82. Further, the first calculation result determination unit 13 and the second calculation result determination unit 23 are collectively referred to as a calculation result determination unit 33. Moreover, the modulated waves S1A and S2A are collectively referred to as modulated waves SA, and the modulated waves S1B and S2B are collectively referred to as modulated waves SB. The modulation periods T1A and T2A are collectively referred to as modulation period TA, and the modulation periods T1B and T2B are collectively referred to as modulation period TB. The frequency bands B1A and B2A are collectively referred to as a frequency band BA, and the frequency bands B1B and B2B are collectively referred to as a frequency band BB.

First, at step S100, the A processing unit 81 transmits and receives the modulated waves SA having the frequency band BA and the modulation period TA which have been set by the control unit 50 to acquire beat signals. In the case where the modulated waves SA incudes NA chirp waves, NA beat signals are acquired, where NA is a whole number.

Next, at step S110, the A processing unit 81 performs a frequency analysis of NA beat signals acquired at step S100 and calculates a first distance speed spectrum. The first distance speed spectrum refers to a distance speed spectrum including the distance information and the speed information. Specifically, as shown in FIG. 10, the A processing unit 81 executes an FFT process as a first FFT process, for each of NA beat signals to calculate NA distance spectrum. The distance spectrum is a two-dimensional spectrum indicating power with respect to the distance. Since the beat signals include frequency components depending on the distance to the object, the frequency BIN of the calculated distance spectrum corresponds to the distance BIN.

Further, the A processing unit 81 executes the FFT process as a second FFT process for respective distance BINs of the calculated NA distance spectrum, thereby calculating the first distance speed spectrum. The distance speed spectrum refers to a three-dimensional spectrum indicating power with respect to the distance and the speed.

Subsequently, at step S120, the A processing unit 81 searches the distance BIN and the speed BIN each indicating a peak in the first distance speed spectrum calculated at step S110, thereby extracting the peaks to be an object signal indicating a presence of an object. Then, the A processing unit 81 calculates the distance Ra and the speed Va from the extracted distance BIN and the speed BIN of the object signal.

Next, at step S130, the B processing unit 82 transmits and receives the modulated waves SB having the frequency band BB and the modulation period TB which have been set by the control unit 50 to acquire beat signals. In the case where the modulated waves S1B includes NB chirp waves, NB beat signals are acquired.

At step S140, similar to the process at step S110, the B processing unit 82 performs a frequency analysis for NB beat signals acquired at step S130 to calculate the second distance speed spectrum as a distance speed spectrum.

Next at step S150, similar to the process at step S120, the B processing unit 82 searches peaks in the second distance speed spectrum calculated at step S140, thereby extracting the peaks as an object signal. Then, the B processing unit 82 calculates the distance Rb and the speed Vb of the object from the extracted distance BIN and the speed BIN of the object signal.

At step S160, the calculation result determination unit 33 executes a pairing between an object signal extracted at step S120 and an object signal extracted at step S160 such that two object signals indicating the same object are paired. For the pairing, distances Ra and Rb, and the speed Va and Vb calculated at steps S120 and S160 are used.

Subsequently, at step S170, the calculation result determination unit 33 determines, for the object signal which the pairing is completed, the distance R and the speed V of the object for the object signals which are paired at step S160, based on the distance Ra and the speed Va calculated by the A processing unit 81 at step 120 and the distance Rb and the speed Vb calculated by the B processing unit 82 at step S160.

As described above, the distance resolution of the distance Rb calculated by the B processing unit 82 is higher than that of the distance Ra calculated by the A processing unit 81. Also, the speed resolution of the speed Va calculated by the A processing unit 81 is higher than that of the speed Vb calculated by the B processing unit 82. Hence, the calculation result determination unit 33 determines the distance Rb to be the distance R and the determines the speed Va to be the speed V. Thus, the distance R having higher distance resolution and the speed V having higher speed resolution V are determined.

Further, as described above, in the case where the chirp periods Tcy between the modulated waves SA and the modulated wave SB are different, the maximum detection speed Vmax of the speed Va and the maximum detection speed Vmax of the speed Vb are different. Thus, in this case, the calculation result determination unit 33 recognizes a speed value having larger maximum detection speed Vmax in either the speed Va or the speed Vb, to be the true value in which folding is not present, and determines whether a speed value having smaller maximum detection speed Vmax has folding. Then, the calculation result determination unit 33 executes a folding calibration when determined that a speed value having smaller maximum detection speed Vmax has folding, and determines the speed V using the value where the folding calibration is applied.

The calculation result determination unit 33 may use the calculation result of the B processing unit 82 only when the distance to the object is smaller than a predetermined far-distance threshold. Since the modulation period of the modulated waves SB is smaller than that of the modulation period of the modulated waves SA, the beat signals in accordance with the modulated waves SB has a S/N ratio smaller than that of the beat signals in accordance with the modulated waves SA. Especially, when the distance to the object is larger, the signal level becomes weak and the S/N ratio of the beat signals in accordance with the modulated waves SB becomes small. Thus, the calculation result determination unit 33 may use the calculation result of the B processing unit 82 only for a range where the S/N ratio exceeds a predetermined value, and may not use the calculation result of the B processing unit 82 for a range where the S/N ratio is smaller than the predetermined value, that is, the distance to the object is larger. The predetermined far-distance threshold may be set such that the S/N ratio of the beat signals in accordance with the modulated waves SB is a predetermined value.

Further, since the calculation result of the A processing unit 81 has relatively low distance resolution, it is not suitable for using the calculation result for a close-distance range. Thus, the calculation result determination unit 33 may only use the calculation result of the B processing unit 82 in the processing results of the A processing unit 81 and the B processing unit 82, in the case where the distance to the object is smaller than a predetermined close-distance threshold. The predetermined close-distance threshold is smaller than the predetermined far-distance threshold, and may be set based on a range of close-distance which requires relatively high distance resolution depending on usage of application. Specifically, for a close-distance range specified by the close-distance threshold, the calculation result determination unit 33 may determine the distance R and the speed V using only the calculation result of the B processing unit 82, and for a range specified from the close-distance threshold to the far-distance threshold, may determine the distance R and the speed V by using the calculation result of the A processing unit 81 and the calculation result of the B processing unit 82. Then, the calculation result determination unit 33 may determine the distance R and the speed V using only the calculation result of the A processing unit 81 for a range farther than the far-distance threshold. Then, the process is terminated.

Operation

Figure 11:
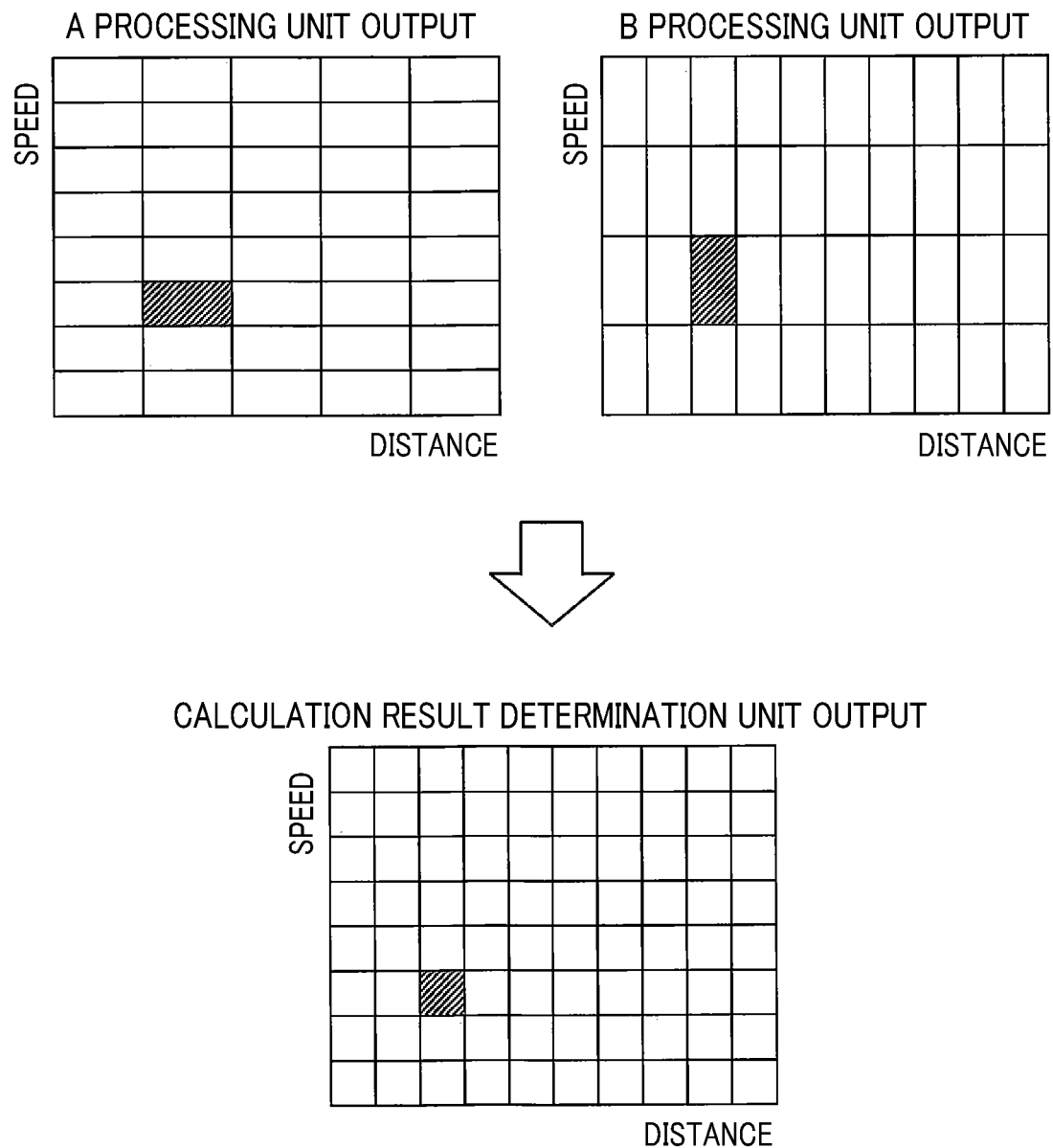
FIG. 11 is an explanatory diagram showing an example of a method of determining the speed and the distance according to the first embodiment.
Figure 12:
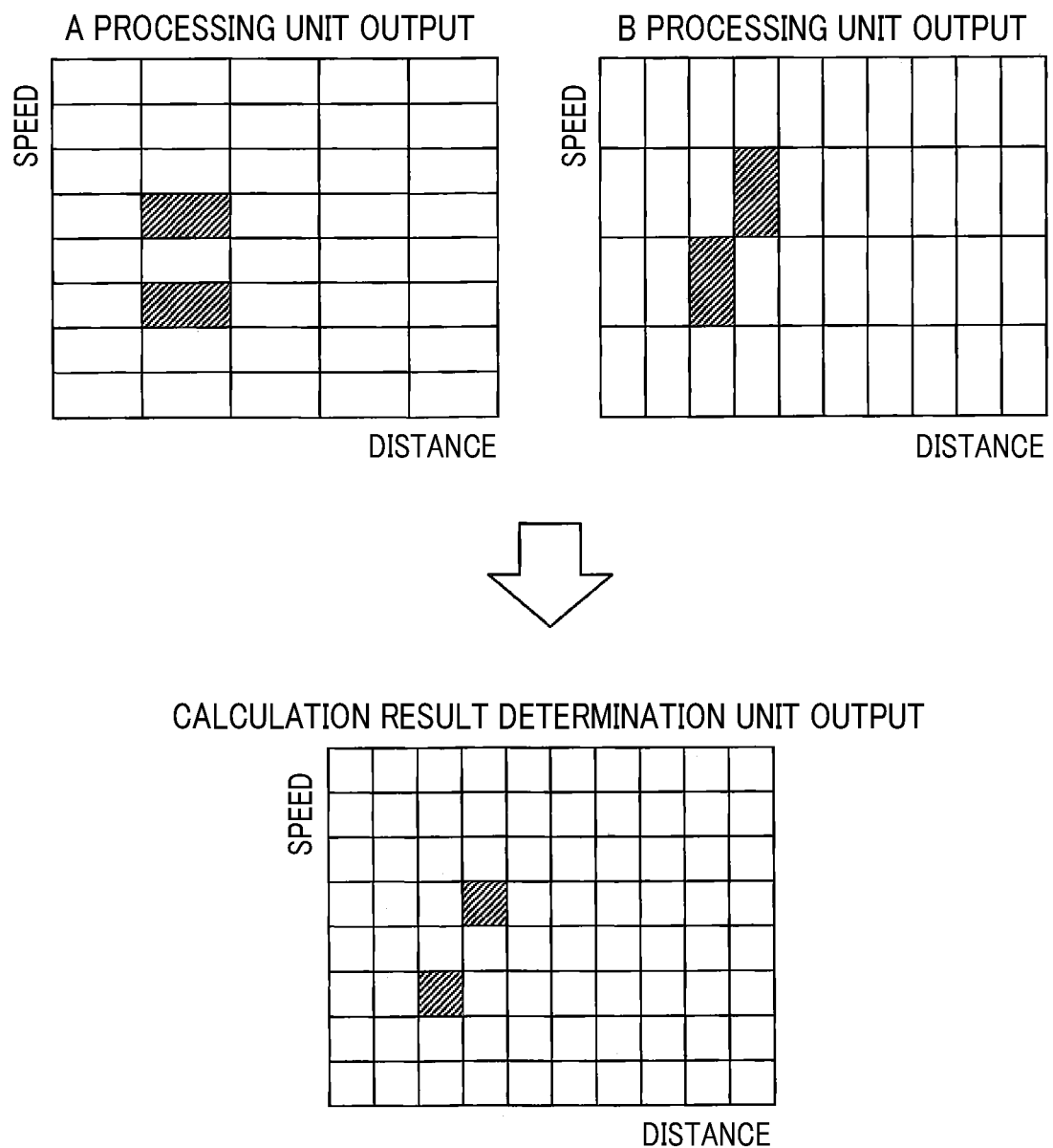
FIG. 12 is an explanatory diagram showing another example of a method of determining the speed and the distance according to the first embodiment.

FIGS. 11 and 12 are examples each illustrating a determination in which the output of the calculation result of the A processing unit 81 and the output of the calculation result of the B processing unit 82 are compared, thereby determining the distance R and the speed V to the object. Note that intervals between grids in the horizontal axis shows a distance resolution and intervals between grids in the vertical axis shows a speed resolution. FIG. 11 is an example in which an object is detected. Specifically, the calculation result of the A processing unit 81 and the calculation result of the B processing unit 82 are combined, thereby determining the distance R and the speed V to the object which are expressed by the speed resolution of the calculation result of the A processing unit 81 and the distance resolution of the calculation result of the B processing unit 82.

FIG. 12 is an example of two objects being detected. According to the calculation result of the A processing unit 81, since the distance resolution is relatively low, two objects are detected with the same distance. However, according to the calculation result of the B processing unit 82, since the distance resolution is relatively high, two objects are detected with different distances. The calculation results of the A processing unit 81 and the B processing unit 82 are combined, whereby two objects having different speeds V and the distances R.

Figure 13:
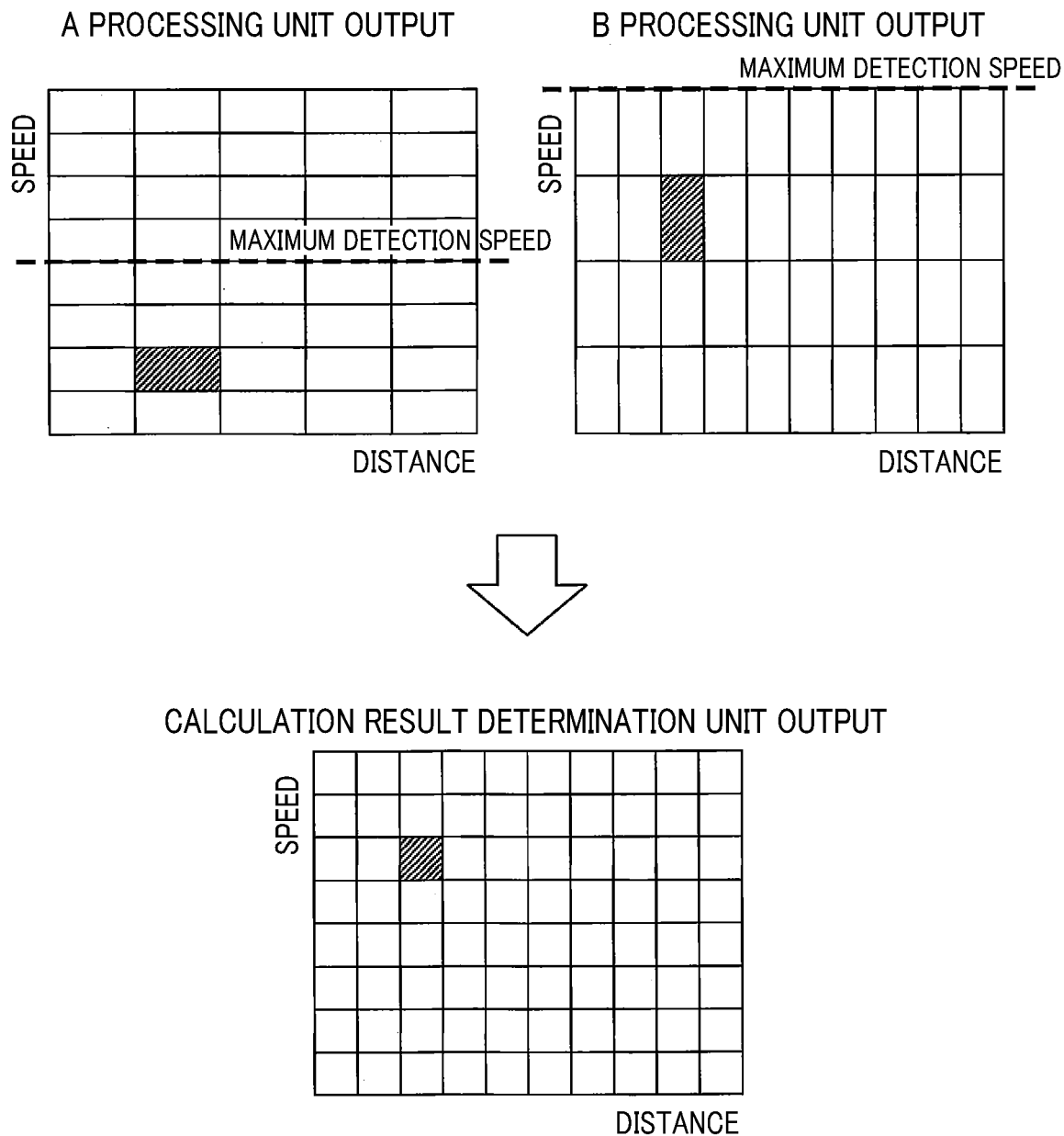
FIG. 13 is an explanatory diagram showing another example of a method of determining the speed and the distance according to the first embodiment.

FIG. 13 is an example illustrating a state for determining the distance R and the speed V of the object in the case where the maximum detection speed Vmax of the speed Vb calculated by the B processing unit 82 is larger than the maximum detection speed Vmax of the speed Va calculated by the A processing unit 81. In this case, the speed Vb is recognized as a true value in which folding is not present. Since the speed Vb is different from the speed Va and is larger than the maximum detection speed Vmax of the speed Va, folding is present in the speed Va. Thus, the folding of the speed Va is calibrated, and the speed V corresponding to the speed Vb and expressed by the speed resolution of the speed Va is determined. Moreover, the distance Rb is determined as the distance R.

Effects and Advantages

According to the present embodiment, the followings effects and advantages can be obtained.

(1) The first A processing unit 11 and the second A processing unit 21 calculate the speed Va having relatively high speed resolution and the distance Ra having relatively low distance resolution, based on the frequency bands B1A and B2A which are not overlapped with each other, and the modulated waves S1A and S2A having relatively long modulation periods T1A and T2A. Further, the first B processing unit 12 and the second B processing unit 22 calculate the speed Vb having relatively low speed resolution and the distance Rb having relatively high distance resolution, based on the modulation periods T1B and T2B which are not overlapped with each other, and the modulated waves S1B and S2B having relatively wide frequency bands B1B and B2B. The calculation results of the first A processing unit 11 and the second A processing unit 21 and the calculation results of the first B processing unit 12 and the second B processing unit 22 are combined, whereby the relative speed and the distance to the object are determined. Thus, the speed V having high speed resolution and the distance R having high distance resolution can be determined, while suppressing an interference between a plurality of radar units.

(2) The calculation results of the A processing unit 81 and the B processing unit 82 are combined for the object signals in which a pairing is completed. Thus, the calculation result of the A processing unit 81 and the calculation result of the B processing unit 82 for the same object are merged, whereby the speed V and the distance R of the object having the high speed resolution and the high distance resolution can be determined.

(3) In the case where the calculation result determination unit 33 defines the above-described far-distance threshold to be an upper limit distance using the calculation result of the B processing unit 82, erroneous detection of the distance R of the object present in the distance.

(4) In the case where the calculation result determination unit 33 uses only the calculation result of the B processing unit 82 for a close-distance range closer than the close-distance threshold, the distance R to the object can be determined only using an appropriate calculation result for the close-distance range.

(5) Among the speed Va calculated by the A processing unit 81 and the speed Vb calculated by the B processing unit 82, a speed value having the larger detection speed Vmax is recognized as a true value, whereby a value having the smaller maximum detection speed Vmax can be determines whether folding is present. Thus, the speed V having higher accuracy can be determined.

(6) In the case where the frequency control unit 50a changes the frequency bands BA and BB depending on the travelling speed of the vehicle 70, and the time control unit 50b changes the modulation periods TA and TB, a requirement of an application software that uses the detection result of the object can be satisfied.

Second Embodiment

Differences Between the Second Embodiment and the First Embodiment

The second embodiment has basic configuration which is the same as those in the first embodiment. Hence, an explanation of the common configuration will be omitted and configuration different from the first embodiment will be mainly described. Note that reference numbers as same as those in the first embodiment indicate the same configuration as the first embodiment, and the explanation of the first embodiment is applied thereto.

Figure 14:
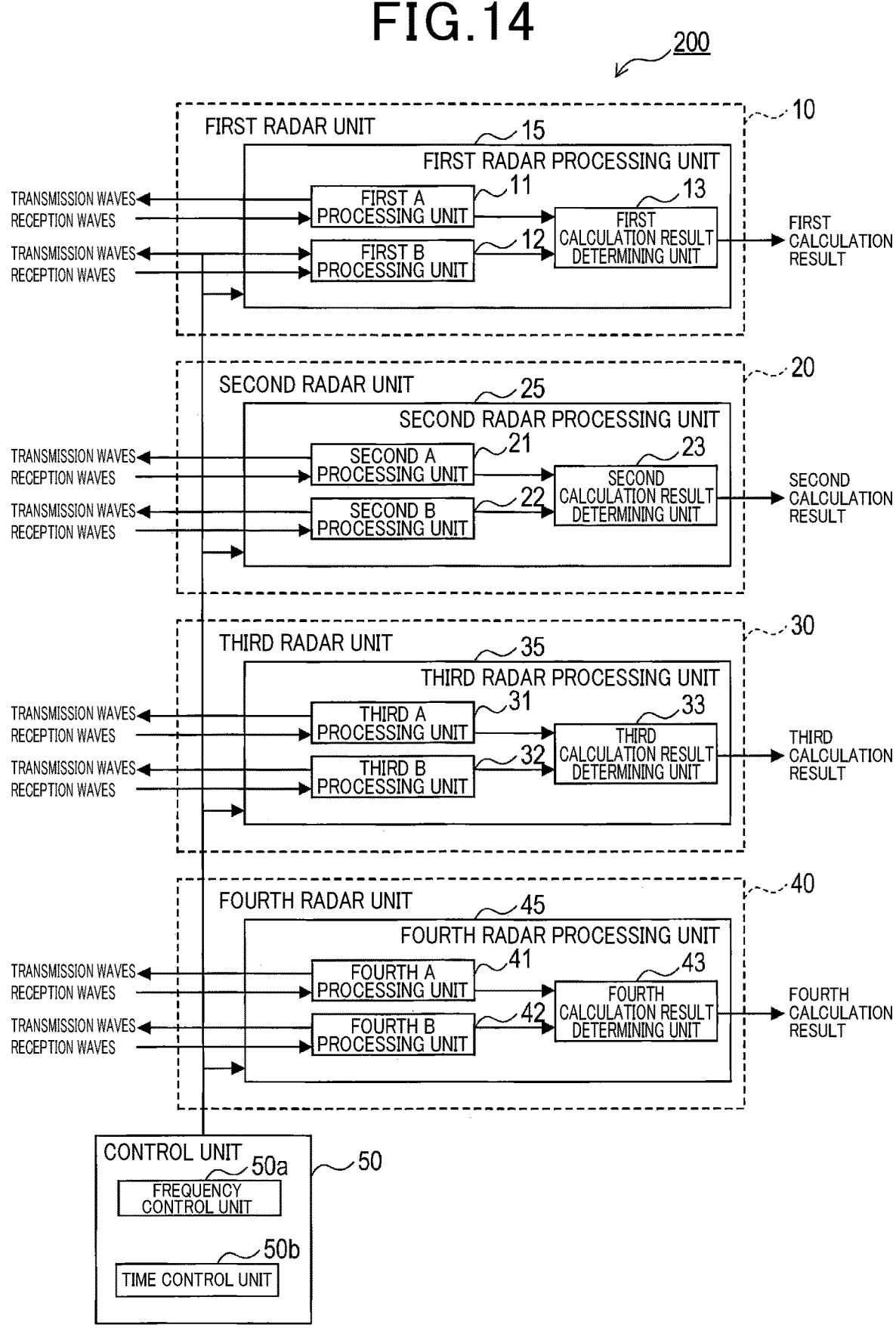
FIG. 14 is a block diagram showing a configuration of a radar system according to a second embodiment of the present disclosure.

A radar system 200 according to the second embodiment includes three or more radar units. Specifically, as shown in FIG. 14, the radar system 200 is provided with four radar units including a first radar unit 10, a second radar unit 20, a third radar unit 30, a fourth radar unit 40. The third radar unit 30 and the fourth radar unit 40 each has a configuration similar to the first radar unit 10 and the second radar unit 20, and transmit and receives modulated waves S3A and S4A as the first modulated waves, and modulated waves S3B and S4B as the second modulated waves.

Figure 15:
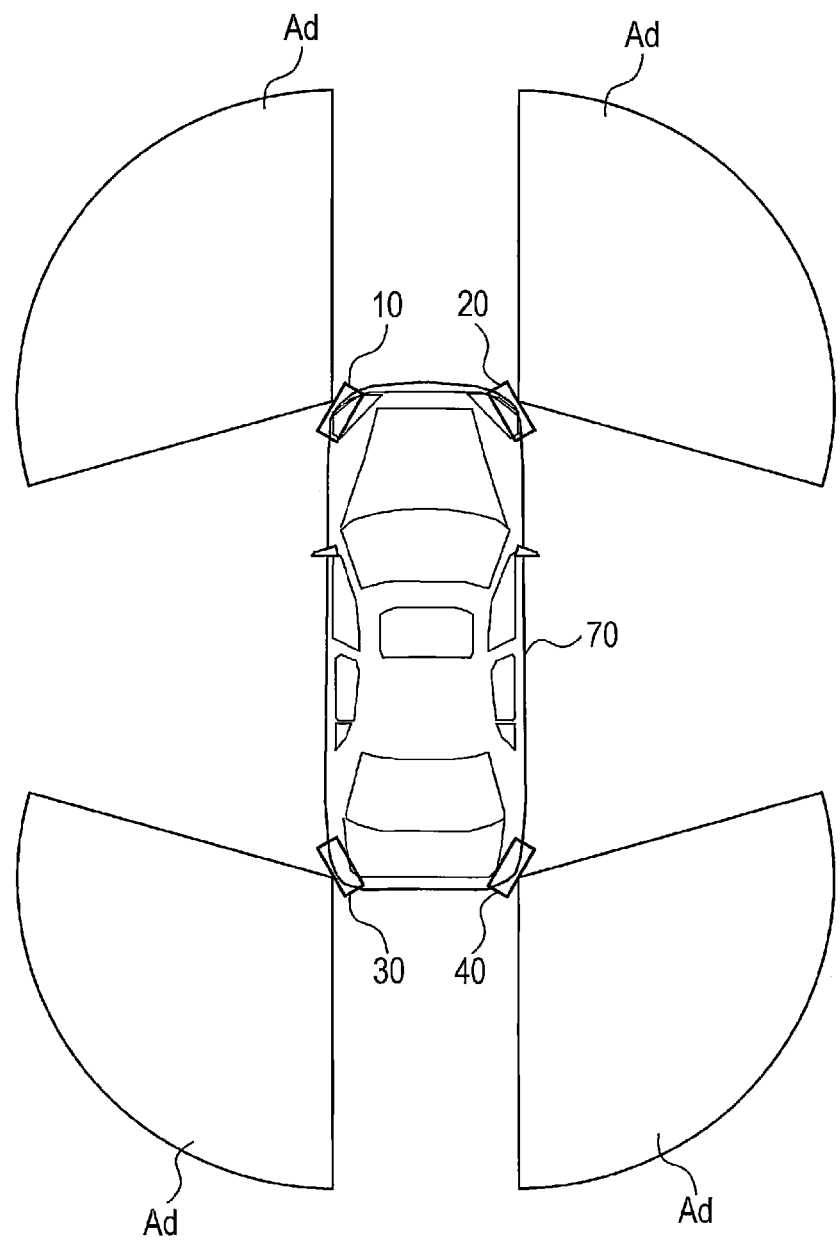
FIG. 15 is an example of mounting positions of radar units and a detection range according to the second embodiment.

The four radar units are mounted at different positions in the vehicle 70 so as to observe mutually different areas around the vehicle 70. For example, as shown in FIG. 15, the first radar unit 10 and the second radar unit 20 may be mounted at both left-right ends of the front bumper of the vehicle 70, and have the detection ranges Ad to be a front left area and a front right area of the vehicle 70. Further, the third radar unit 30 and the fourth radar unit 40 may be mounted at both left-right ends of the rear bumper of the vehicle 70 and have the detection ranges Ad to be a rear left area and a rear right area of the vehicle 70.

According to the radar system 100 of the first embodiment, a plurality of radar units included in the radar system 100 are simultaneously operated. In contrast, according to a radar system 200 of the second embodiment, a plurality of radar units included in the radar system 200 constitute a plurality of groups. In each group, two or more radar units are included. In the radar system 200, the plurality of groups sequentially operates for each group one by one in accordance with a prescribed pattern to transmit and receive the first modulated waves and the second modulated waves. The interval between a time when one group starts to operate and a time when the next group starts to operate, is set to be longer than a period where a plurality of radar units included in one group transmit and receive the first and second modulated waves.

Figure 16:
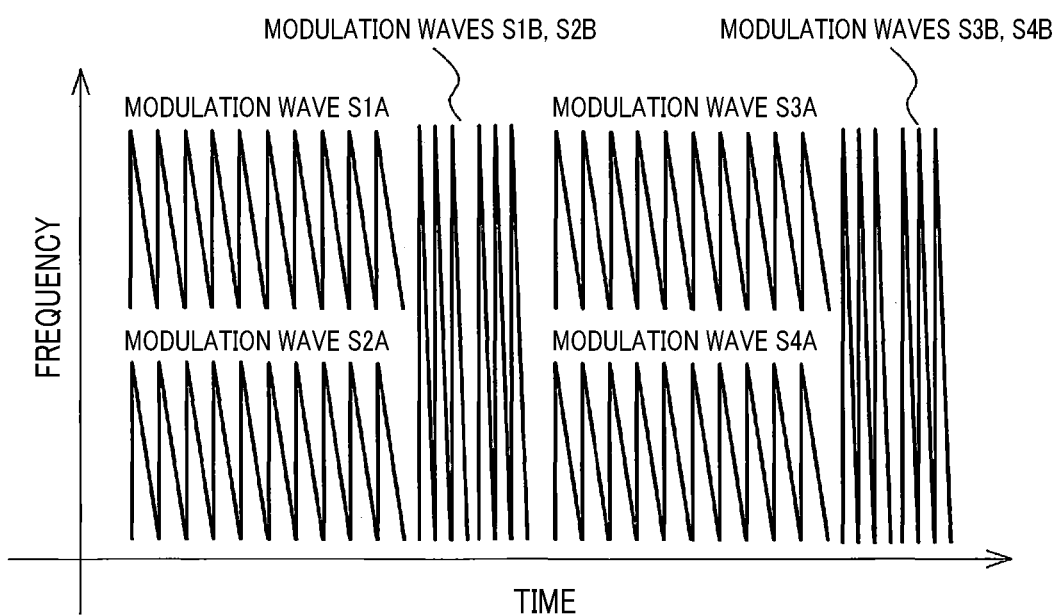
FIG. 16 is an example of modulated waves transmitted from first to fourth radar units and received by the first to fourth radar units according to the second embodiment.

FIG. 16 illustrates a timing diagram of modulated waves S1A, S2A, S3A and S4A, and the modulated waves S1B, S2B, S3B and S4B, where four radar units 10, 20, 30 and 40 are divided into two groups X and Y, and the group X and the group Y alternately operates. The group X includes a first radar unit 10 and the second radar unit 20, and the group Y includes the third radar unit 20 and the fourth radar unit 40. In this case, a prescribed pattern is prepared for alternately operating the group X and the group Y. In the case where the group X operates, similar to the first embodiment, the first radar processing unit 15 and the second radar processing unit 25 execute a process for determining the speed and the distance. Also, when the group Y operates, instead of using the first radar processing unit 15 and the second radar processing unit 25, the third radar unit 35 and the fourth radar unit 45 execute the determining process of the speed and the distance.

In other words, the frequency control unit 50a and the time control unit 50b set the modulation periods and the frequency bands of the first and second modulated waves transmitted from respective radar units such that the modulated waves transmitted and received by the respective radar units included in a group to be activated to satisfy the above-described conditions (A) to (F). Then, processing units of the respective radar units included in the group to be operated execute the determining process of the speed and the distance.

Note that modulation patterns to activate the group X and the group Y may not necessarily be an alternating pattern, but may be a modulation pattern causing the groups X and Y to activate with a ratio of 2 to 1. Further, the modulation pattern causing the group X and the group Y to activate may be changed. For example, the control unit 50 may change the modulation pattern causing the groups X and Y to activate depending on the travelling speed of the vehicle and the state in the vicinity of the respective radar units included in the radar system 200. Moreover, a formation of the groups, that is, arrangement into groups may be changed. For example, the control unit 50 may arrange the group X including the first radar unit 10 and the third radar unit 30, and the group Y including the second radar unit 20 and the fourth radar unit 40. Also, a single z radar unit may be included in a plurality of groups. For example, the group X may include the first radar unit 10, the second radar unit 20 and the third radar unit 30, and the group Y may include the first radar unit 10, the second radar unit 20 and the fourth radar unit 40.

According to the second embodiment as described above, in the radar system 200 provided with three or more radar units, even in the case where selected two or more radar units are activated, effects and advantages similar to (1) to (6) can be obtained.

Third Embodiment

Differences Between the Third Embodiment and the First Embodiment

The third embodiment has basic configuration which is the same as those in the first embodiment. Hence, an explanation of the common configuration will be omitted and configuration different from the first embodiment will be mainly described. Note that reference numbers as same as those in the first embodiment indicate the same configuration as the first embodiment, and the explanation of the first embodiment is applied thereto.

Figure 17:
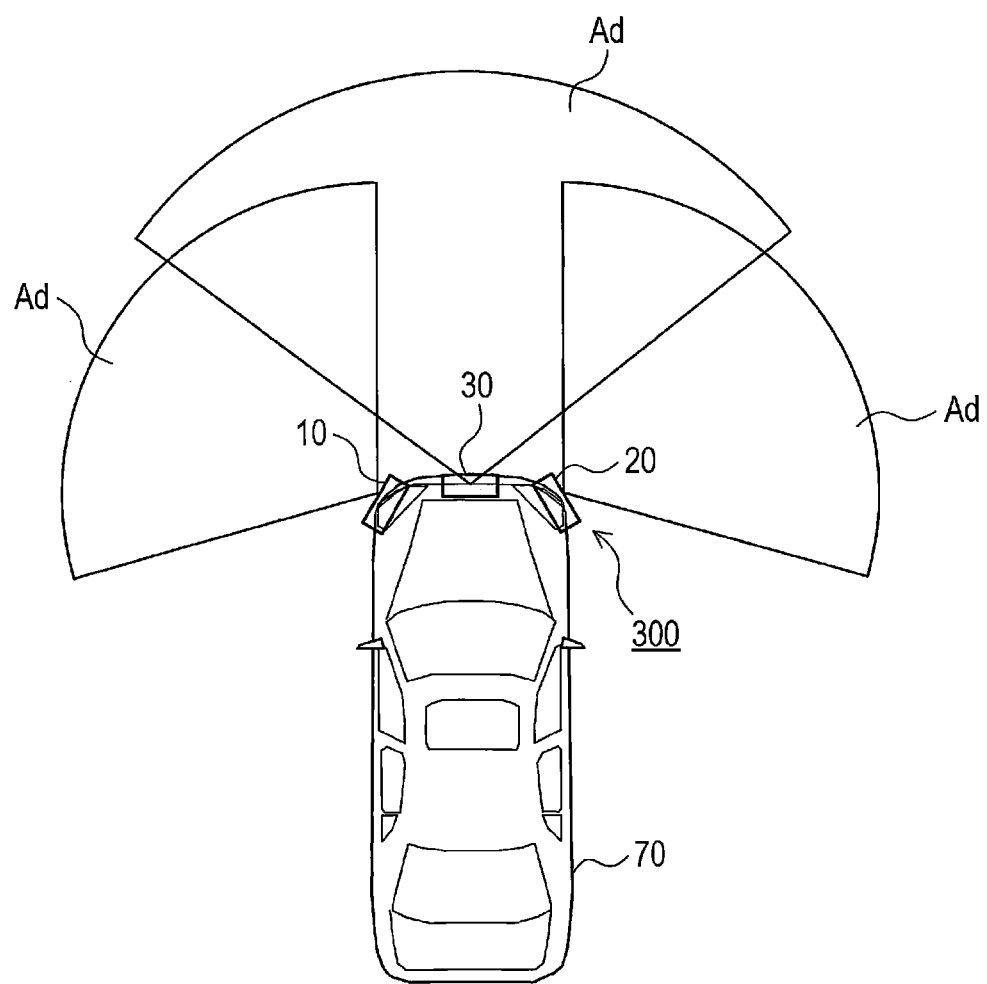
FIG. 17 is an example of mounting positions of radar units and a detection range according to a third embodiment.

As shown in FIG. 17, a radar system 300 according to the third embodiment is provided with three radar units of a radar unit 10, a second radar unit 20 and a third radar unit 30.

Three radar units are mounted at different positions in the vehicle 70 so as to detect mutually different areas in the vicinity of a vehicle 70. For example, as shown in FIG. 17, the first radar unit 10, the second radar 20 may be mounted at both ends of a front bumper of the vehicle 70 in a left-right direction of the front bumper, and have detection ranges Ad to be a front left area and a front right area of the vehicle 70. Also, the third radar 30 may be mounted at a center position of the front bumper of vehicle 70, and have detection ranges Ad to be a front area.

The radar system 300 according to the third embodiment may be simultaneously activated the three radar units 10, 20 and 30 similar to the first embodiment, or may divide the three radar units 10, 20 and 30 into a plurality of groups and may be sequentially activated for each group one by one.

Figure 18:
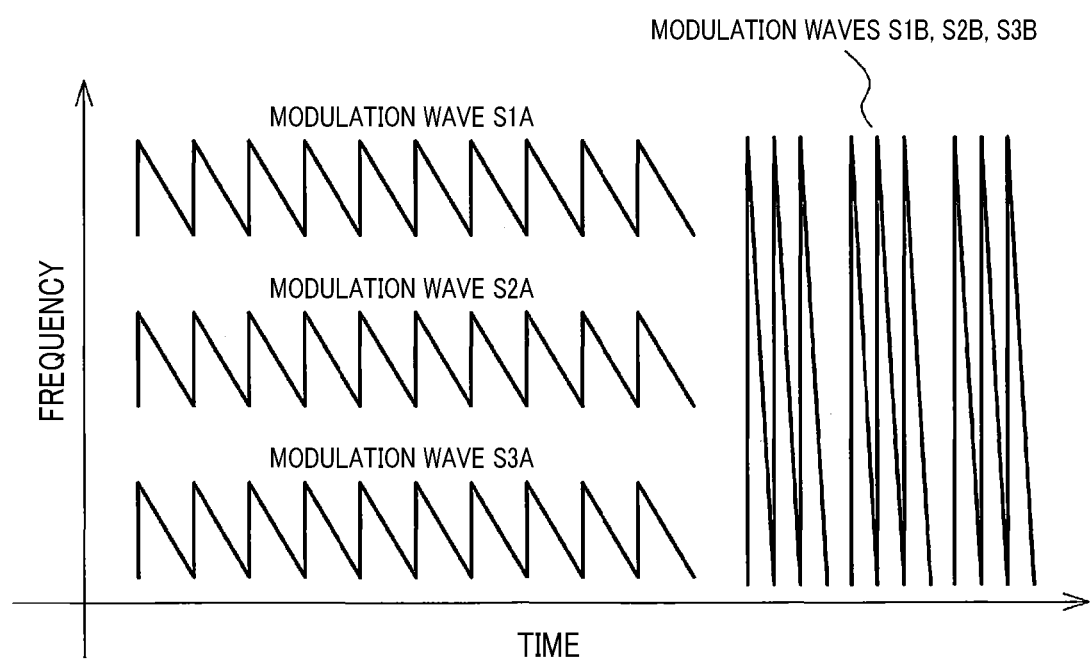
FIG. 18 is an example of modulated waves transmitted from first to third radar units and received by the first to third radar units according to the third embodiment.

FIG. 18 is a timing diagram showing the modulated waves S1A, S2A, S3A (i.e. first modulated waves), the modulated waves S1B, S2B and S3B (i.e. second modulated waves) in the case where all of three radar units are simultaneously activated.

Figure 19:
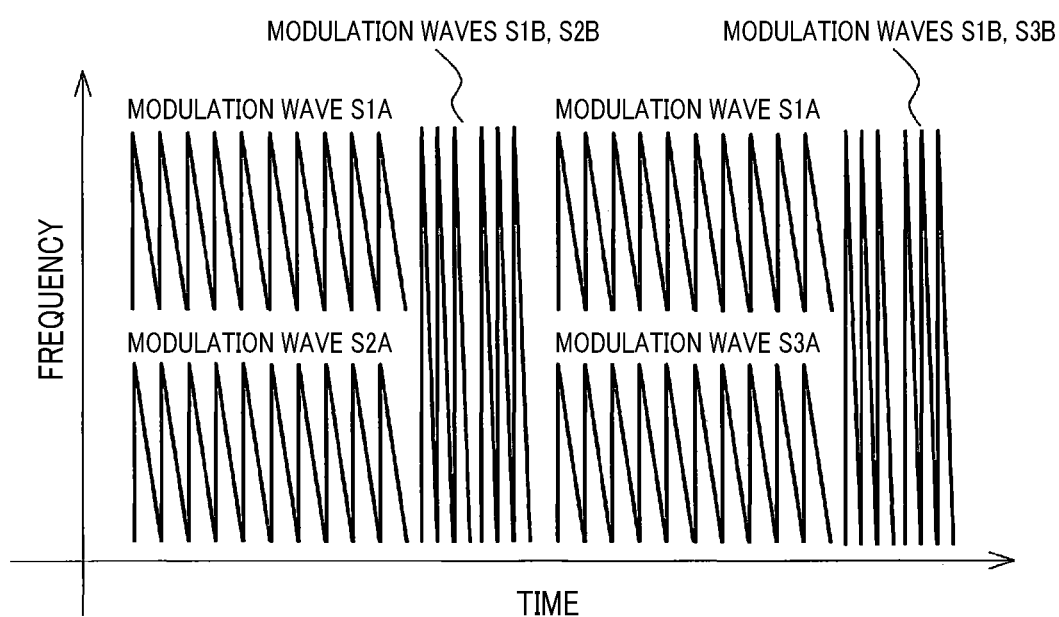
FIG. 19 is another example of modulated waves transmitted from first to third radar units and received by the first to third radar units according to the third embodiment.
Figure 20:
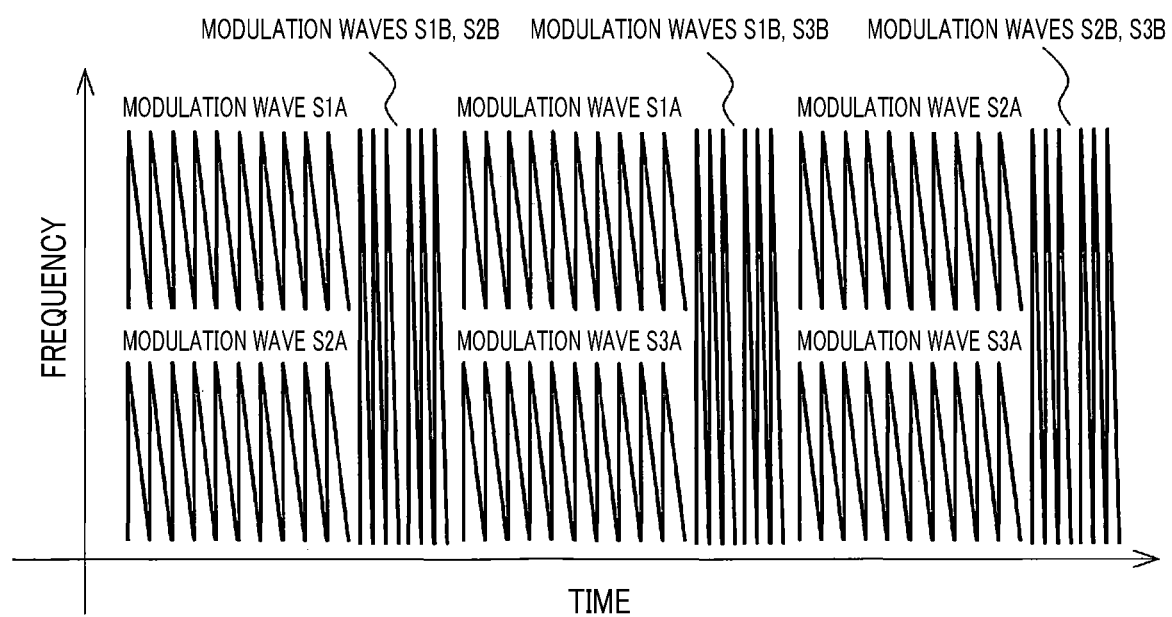
FIG. 20 is another example of modulated waves transmitted from first to third radar units and received by the first to third radar units according to the third embodiment.

On the other hand, FIGS. 19 and 20 are timing diagrams showing the modulated waves S1A, S2A, S3A (i.e. first modulated waves) and the modulated waves S1B, S2B and S3B (i.e. second modulated waves) in the case where the three radar units 10, 20 and 30 are divided into a plurality of groups and are sequentially activated one by one.

FIG. 19 shows a case where the three radar units 10, 20 and 30 are divided into two groups X and Y, and the group X and the group Y are alternately activated. The group X includes the first radar unit 10 and the second radar unit 20, and the group Y includes the first radar 10 and the third radar 30. FIG. 20 shows a case where the three radar units 10, 20 and 30 are divided into three groups X, Y and Z, and are activated in the order of the group X, the group Y, the group Z, group X and so on. The group X includes the first radar unit 10 and the second radar unit 20, the group Y includes the first radar unit 10 and the third radar unit 30, and the group Z includes the second radar unit 20 and the third radar unit 30.

Other Embodiments

Embodiments of the present disclosure are described so far. The present disclosure is not limited to the above-described embodiments, and can be modified in various manners.

(a) According to the above-described embodiments, the B processing unit 82 is configured to calculate the second distance speed spectrum. However, since the speed resolution of the calculation result of the B processing unit 82 is relatively low, the B processing unit 82 may only calculate the distance spectrum. In other words, at step S140, the B processing unit 82 may execute only the distance Rb without executing the second FFT process.

Figure 21:
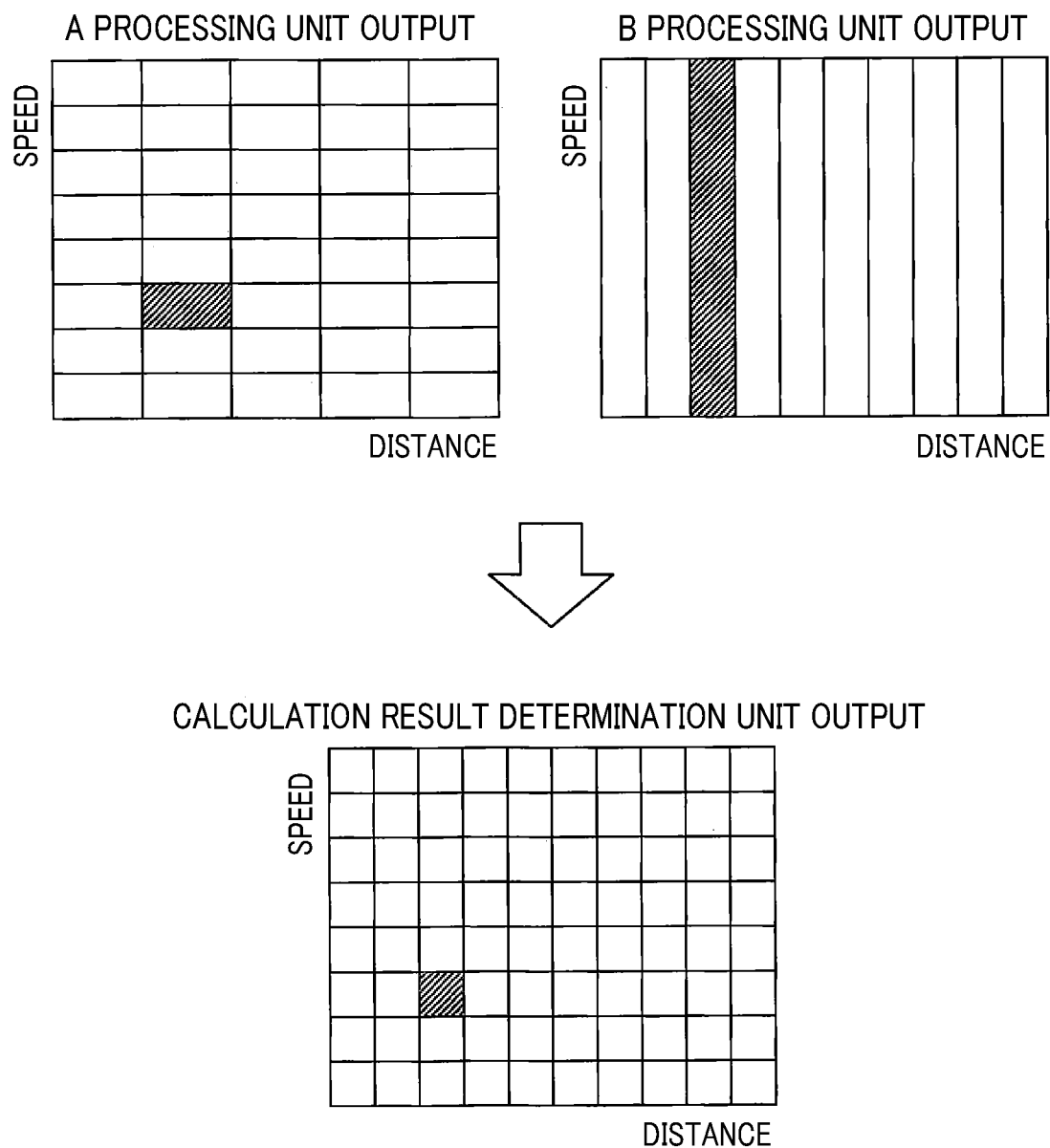
FIG. 21 is an explanatory diagram showing an example of a method of determining a speed and a distance according to another embodiment.
Figure 22:
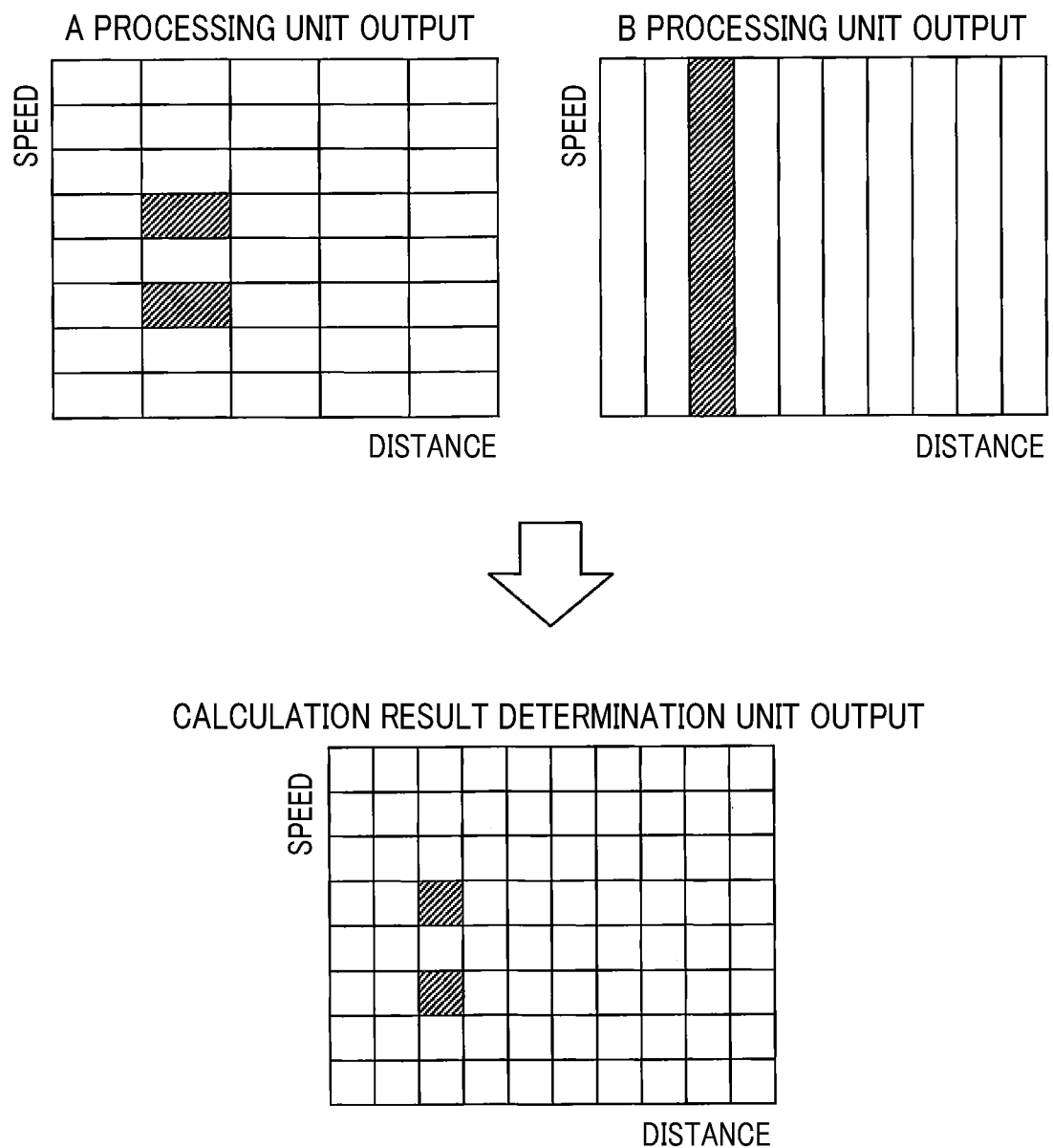
FIG. 22 is an explanatory diagram showing another example of a method of determining a speed and a distance according to another embodiment.
Figure 23:
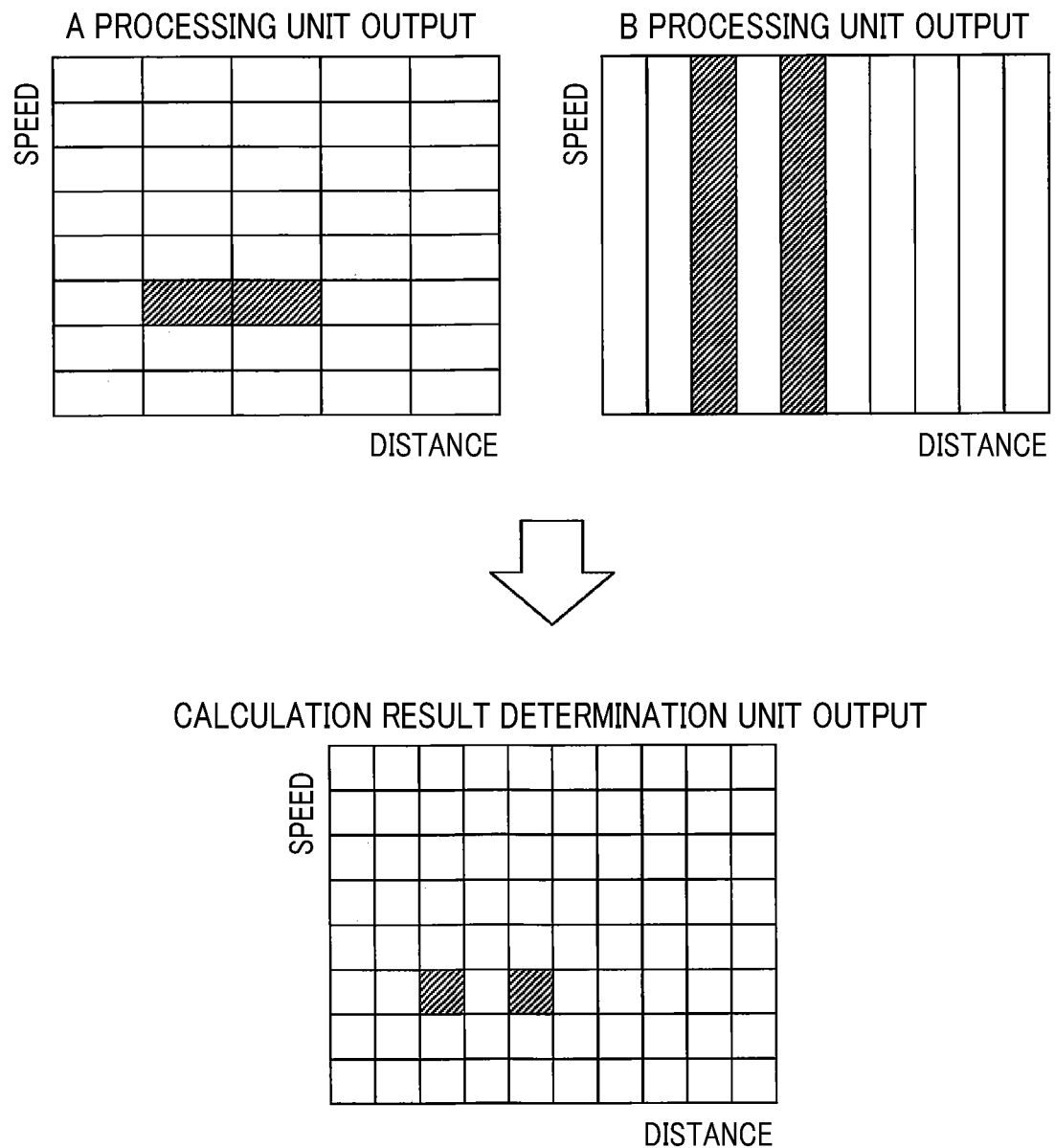
FIG. 23 is an explanatory diagram showing another example of a method of determining a speed and a distance according to another embodiment.

FIGS. 21 to 23 illustrates a process for determining the distance R and the speed V to the object in a case where the B processing unit 82 calculates only the distance Rb. FIGS. 22 and 23 exemplifies a case where two objects are detected. In each example shown in FIGS. 21 to 23, the distance R and the speed V are determined, which are expressed by the speed resolution of the calculation result of the A processing unit 81 and the distance resolution of the calculation result of the B processing unit.

(b) At step 120, the A processing unit 81 may apply an incoming direction predicting algorithm to the extracted object signal, thereby calculating azimuthal spectrum of the object with respect to the vehicle 70. Similarly, at step S150, the B processing unit 82 may calculate the azimuthal spectrum from the extracted object signal. Then, at step S160, the calculation result determination unit 33 may also use azimuth information included in the azimuthal spectrum to pair the object signal extracted by the A processing unit 81 and the object signal extracted by the B processing unit. Thus, the object signals can be paired accurately.

(c) According to the first embodiment, the control unit 50 may be provided with function of a priority setting unit that sets the priority between the first radar unit 10 and the second radar unit 20, depending on the situation in the vicinity of the first radar 10 and the second radar 20. For example, in the case where an object is present in a close range of either one of the first radar unit 10 and the second radar unit 20, the priority setting unit may set the priority of the one radar unit in which the object is present in the close range to be higher than the other radar unit. Moreover, in the case where a large number of objects are present around one radar unit, the priority setting unit may set one radar unit to be higher than the other radar unit.

Figure 24:
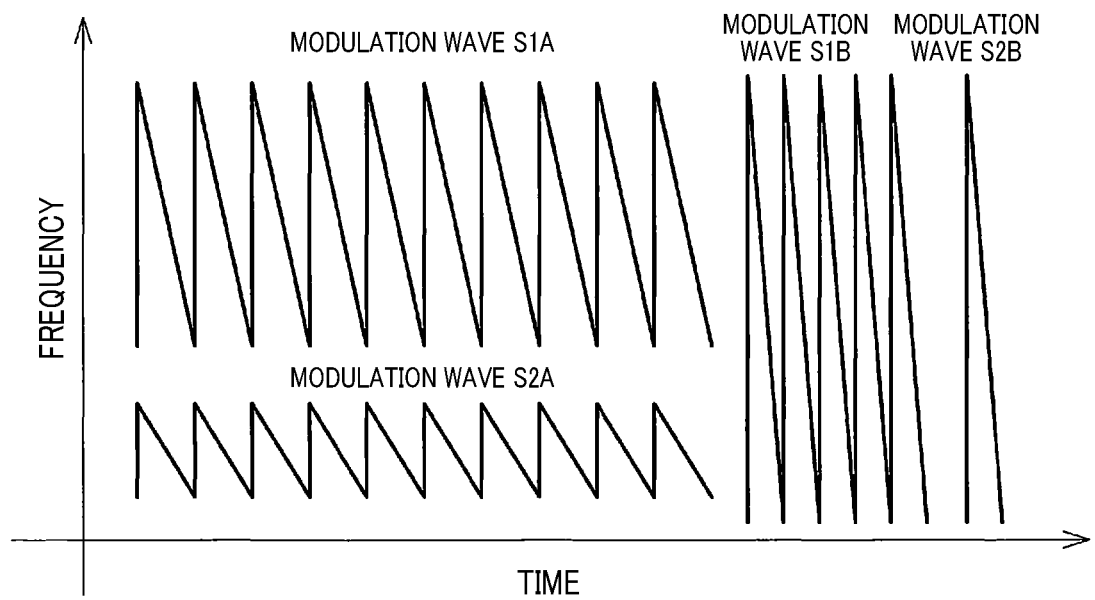
FIG. 24 is a diagram showing modulated waves transmitted from a first and second radar units and received by the first and second radar units according to another embodiment.

As shown in FIG. 20, the frequency control unit 50a sets the frequency band BA of modulated waves SA such that the higher the priority which has been set to a radar, the wider the frequency band BA of the modulated waves SA transmitted and received at the radar is. Further, as shown in FIG. 20, the time control unit 50b sets the modulation period TB of modulated waves SB such that the higher the priority which has been set to a radar, the larger the modulation period TB of the modulated waves SB transmitted and received at the radar. FIG. 24 is an example in which the priority of the first radar 10 is higher than the second radar 20, in which the frequency band B1A wider than that of the modulated waves S2A is assigned to the modulated waves S1A, and the modulation period T1B wider than that of the modulated waves S2B is assigned to the modulated waves S1B. Thus, for a radar unit having higher priority, wider frequency band and larger modulation period can be utilized, and the speed resolution and the distance resolution can be improved depending on the situation in the vicinity of the radar. Similarly, in the second embodiment, the control unit 50 may include functions of the priority setting unit that sets priorities of two or more radar units included in the group to be activated.

Figure 25:
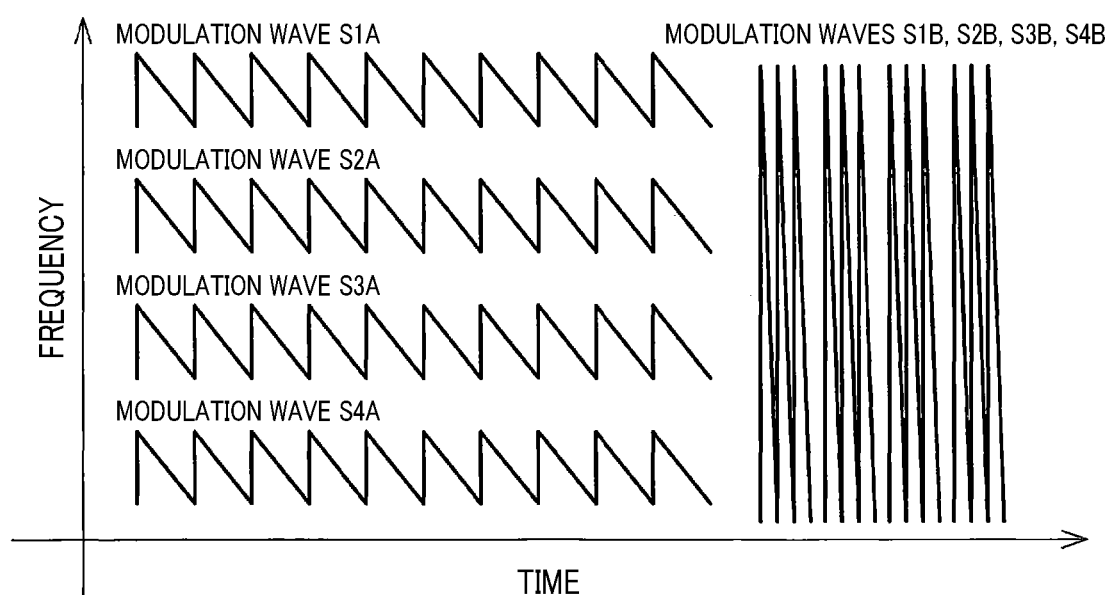
FIG. 25 is a diagram showing an example of modulated waves transmitted from a first and second radar units and received by the first and second radar units according to another embodiment.

(d) In the first embodiment, the radar system 100 includes two radar units. The number of radar units may be three or more. For example, as shown in FIG. 15, the radar system 100 may include the third radar unit 30 and the fourth radar unit 40 which are mounted at both ends of the rear bumper in the left-right direction, in addition to the first radar unit 10 and the second radar unit 20 mounted at both ends of the front bumper in the left-right direction. In the case where the radar system 100 is provided with four radar units, as shown in FIG. 25, the control unit 50 may control the frequency bands and the modulation periods of eight modulated waves so as to satisfy a condition where conditions (i) to (vi) are extended for a relationship between eight modulation periods. Similarly, in the second embodiment, three or more radar units may be included for a group to be activated.

(e) Multiple functions of a single component in the above-described embodiment may be implemented by multiple components, and a single function of a single component may be implemented by multiple components. Moreover, multiple functions of multiple components may be implemented by a single component, and a single function implemented by multiple components may be implemented by a single component. Further, some of the configurations of the above-described embodiment may be omitted. In addition, at least some of the configurations of the above-described embodiment may be added to or replaced with the configurations of the other embodiments described above.

CONCLUSION

As one aspect of the present disclosure, a radar system is provided with a plurality of radar units. Each of the plurality of radar units includes: a first processing unit, a second processing unit, and a calculation result determination unit. The first processing unit is configured to calculate a distance and a relative speed to an object in the vicinity of each radar unit in accordance with a beat signal acquired by transmitting and receiving first modulated waves, a frequency band of the first modulated waves being a first frequency band, and a modulation period of the first modulated waves being a first modulation period. The second processing unit is configured to calculate a distance to the object in accordance with a beat signal acquired by transmitting and receiving second modulated waves, a frequency band of the second modulated waves being a second frequency band, and a modulation period of the second modulated waves being a second modulation period. The calculation result determination unit is configured to determine the distance and the relative speed to the object in accordance with a calculation result of the first processing unit and a calculation result of the second calculation result.

The radar system includes: a frequency control unit and a time control unit. The frequency control unit is configured to control the first frequency band and the second frequency band such that the second frequency band is wider than the first frequency band, first frequency bands of the first modulated waves transmitted and received at respective radar units are different from each other, and second frequency bands of the second modulated waves transmitted and received at respective radar units are overlapped with each other. The time control unit is configured to control the first modulation period and the second modulation period such that the first modulation period is longer than the second modulation period, first modulation periods of the first modulated waves transmitted and received at respective radar units are overlapped with each other, and one second modulation periods of the second modulated waves transmitted and received at respective radar units are different from another second modulation periods and the first modulation periods.

According to the one aspect of the present disclosure, the first processing unit calculates a relative speed of an object having relatively high speed resolution and a distance to the object having relatively high distance resolution. Further, the second processing unit calculates a distance to the object having relatively high distance resolution, based on the second modulated waves having the modulation periods which are not overlapped with each other between the plurality of radar units, and relatively wide frequency band. Thus, the relative speed having high speed resolution and the distance having high distance resolution can be determined based on the calculation result of the first processing unit and the calculation result of the second processing unit. In other words, a high speed resolution and a high distance resolution can be accomplished while suppressing interference between the plurality of radar units.

As another aspect of the present disclosure, a radar system having three or more radar units is provided. Each of the radar units includes a first processing unit, a second processing unit and a calculation result determination unit. The first processing unit is configured to calculate a distance and a relative speed to an object in the vicinity of each radar unit in accordance with a beat signal acquired by transmitting and receiving first modulated waves, a frequency band of the first modulated waves being a first frequency band, and a modulation period of the first modulated waves being a first modulation period. The second processing unit is configured to calculate a distance to the object in accordance with a beat signal acquired by transmitting and receiving second modulated waves, a frequency band of the second modulated waves being a second frequency band, and a modulation period of the second modulated waves being a second modulation period. The calculation result determination unit configured to determine the distance and the relative speed to the object in accordance with a calculation result of the first processing unit and a calculation result of the second calculation result.

The three or more radar units constitute a plurality of groups in which each group includes two or more radar units, the plurality of groups are activated for each group one by one in accordance with a prescribed pattern and transmits and receives the first modulated waves and the second modulated waves.

The radar system includes a frequency control unit and a time control unit. The frequency control unit is configured to control the first frequency band and the second frequency band such that in the two or more radar units included in the each group to be activated, the second frequency band is wider than the first frequency band, first frequency bands of the first modulated waves transmitted and received at respective two or more radar units are different from each other, and second frequency bands of the second modulated waves transmitted and received at respective two or more radar units are overlapped with each other. The time control unit configured to control the first modulation period and the second modulation period such that in the two or more radar units included in each group to be activated. The first modulation period is longer than the second modulation period, first modulation periods of the first modulated waves transmitted and received at respective two or more radar units are overlapped with each other, and one second modulation periods of the second modulated waves transmitted and received at respective two or more radar units are different from another second modulation periods and the first modulation periods.

According to another one aspect, in a radar system provided with three or more radar units, even in a case where selected two or more radar units are activated, effects and advantages similar to the above-described radar system can be obtained.

What is claimed is:

1. A radar system provided with a plurality of radar units, each of the plurality of radar units comprising:
   a first processing unit configured to calculate a distance and a relative speed to an object in the vicinity of each radar unit in accordance with a beat signal acquired by transmitting and receiving first modulated waves, a frequency band of the first modulated waves being a first frequency band, and a modulation period of the first modulated waves being a first modulation period;
   a second processing unit configured to calculate a distance to the object in accordance with a beat signal acquired by transmitting and receiving second modulated waves, a frequency band of the second modulated waves being a second frequency band, and a modulation period of the second modulated waves being a second modulation period; and
   a calculation result determination unit configured to determine the distance and the relative speed to the object in accordance with a calculation result of the first processing unit and a calculation result of the second calculation result,
   wherein
   the radar system comprises:
   a frequency control unit configured to control the first frequency band and the second frequency band such that the second frequency band is wider than the first frequency band, first frequency bands of the first modulated waves transmitted and received at respective radar units are different from each other, and second frequency bands of the second modulated waves transmitted and received at respective radar units are overlapped with each other; and
   a time control unit configured to control the first modulation period and the second modulation period such that the first modulation period is longer than the second modulation period, first modulation periods of the first modulated waves transmitted and received at respective radar units are overlapped with each other, and one second modulation periods of the second modulated waves transmitted and received at respective radar units are different from another second modulation periods and the first modulation periods.

2. A radar system provided with three or more radar units, each of the radar units comprising:
   a first processing unit configured to calculate a distance and a relative speed to an object in the vicinity of each radar unit in accordance with a beat signal acquired by transmitting and receiving first modulated waves, a frequency band of the first modulated waves being a first frequency band, and a modulation period of the first modulated waves being a first modulation period;
   a second processing unit configured to calculate a distance to the object in accordance with a beat signal acquired by transmitting and receiving second modulated waves, a frequency band of the second modulated waves being a second frequency band, and a modulation period of the second modulated waves being a second modulation period; and
   a calculation result determination unit configured to determine the distance and the relative speed to the object in accordance with a calculation result of the first processing unit and a calculation result of the second calculation result,
   wherein
   the three or more radar units constitute a plurality of groups in which each group includes two or more radar units, the plurality of groups are activated for each group one by one in accordance with a prescribed pattern and transmits and receives the first modulated waves and the second modulated waves,
   the radar system comprises:
   a frequency control unit configured to control the first frequency band and the second frequency band such that in the two or more radar units included in the each group to be activated, the second frequency band is wider than the first frequency band, first frequency bands of the first modulated waves transmitted and received at respective two or more radar units are different from each other, and second frequency bands of the second modulated waves transmitted and received at two or more respective radar units are overlapped with each other; and
   a time control unit configured to control the first modulation period and the second modulation period such that in the two or more radar units included in the each group to be activated, the first modulation period is longer than the second modulation period, first modulation periods of the first modulated waves transmitted and received at respective two or more radar units are overlapped with each other, and one second modulation periods of the second modulated waves transmitted and received at respective two or more radar units are different from another second modulation periods and the first modulation periods.

3. The radar system according to claim 1, wherein
the first processing unit is configured to calculate a first spectrum including a distance and a relative speed of the object in accordance with the beat signal based on the first modulated waves, and extract an object signal indicating the object from the calculated first spectrum; and
the second processing unit is configured to calculate a second spectrum including a distance and a relative speed of the object in accordance with the beat signal based on the second modulated waves, and extract an object signal indicating the object from the calculated second spectrum.

4. The radar system according to claim 3, wherein the calculation result determination unit is configured to execute a pairing between the object signal extracted from the first spectrum and the object signal extracted from the second spectrum, and determine a relative speed and distance to the object based on a calculation result of the first processing unit and a calculation result of the second processing unit for the object signal in which the pairing is completed.

5. The radar system according to claim 4, wherein
the first processing unit and the second processing unit are configured to calculate an azimuthal spectrum including azimuth information of the object based on the object signals, and use the azimuth information included in the azimuthal spectrum to pair the objects.

6. The radar system according to claim 1, wherein
the calculation result determination unit is configured to use the calculation result of the second processing unit in the case where a distance to the object is smaller than a predetermined far-distance threshold.

7. The radar system according to claim 1, wherein
the calculation result determination unit is configured to use the calculation result of the second processing unit among the calculation result of the first processing unit and the calculation result of the second processing unit in the case where a distance to the object is smaller than a predetermined close-distance threshold which is smaller than the far-distance threshold.

8. The radar system according to claim 1, wherein
the second processing unit is configured to calculate a distance and a relative speed to the object in accordance with the beat signal based on the second modulated waves.

9. The radar system according to claim 1, wherein
the calculation result determination unit is configured to recognize a relative speed having a larger maximum detection speed in either a relative speed of the object calculated by the first processing unit or a relative speed of the object calculated by the second processing unit, to be a value where no folding is present, and determine whether folding occurs on a relative speed having smaller maximum detection speed, the maximum detection speed being a maximum value of a detectable speed without folding.

10. The radar system according to claim 1, wherein
the plurality of radar units are mounted on a vehicle;
the frequency control unit is configured to change the first frequency band and the second frequency band depending on a travelling speed of the vehicle; and
the time control unit is configured to change the first modulation period and the second modulation period depending on the travelling speed of the vehicle.

11. The radar system according to claim 1, wherein
the radar system further comprising a priority setting unit configured to set priorities of respective radar units depending on a situation in the vicinity of each radar unit;
the frequency control unit is configured to set the first frequency band to be wider for a radar unit having higher priority set by the priority setting unit; and
the time control unit is configured to set the second modulation period to be longer for a radar unit having higher priority set by the priority setting unit.

* * * * *